United States Patent
Newton

(10) Patent No.: US 8,432,377 B2
(45) Date of Patent: Apr. 30, 2013

(54) OPTICAL TOUCHSCREEN WITH IMPROVED ILLUMINATION

(75) Inventor: John Newton, Auckland (NZ)

(73) Assignee: Next Holdings Limited (NZ)

( * ) Notice: Subject to any disclaimer, the term of this patent is extended or adjusted under 35 U.S.C. 154(b) by 1090 days.

(21) Appl. No.: 12/201,463

(22) Filed: Aug. 29, 2008

(65) Prior Publication Data

US 2009/0058833 A1    Mar. 5, 2009

(30) Foreign Application Priority Data

Aug. 30, 2007 (NZ) ........................... 561037

(51) Int. Cl.
*G06F 3/042* (2006.01)
(52) U.S. Cl.
USPC ..................... 345/175; 178/18.09
(58) Field of Classification Search ............... 175/18.01, 175/18.03, 18.09; 345/173, 175
See application file for complete search history.

(56) References Cited

U.S. PATENT DOCUMENTS

| | | |
|---|---|---|
| 844,152 A | 2/1907 | Little |
| 2,407,680 A | 9/1946 | Palmquist et al. |
| 2,769,374 A | 11/1956 | Sick |
| 3,025,406 A | 3/1962 | Stewart et al. |
| 3,128,340 A | 4/1964 | Harmon |
| 3,187,185 A | 6/1965 | Milnes |
| 3,360,654 A | 12/1967 | Muller |
| 3,478,220 A | 11/1969 | Milroy |
| 3,563,771 A | 2/1971 | Tung |
| 3,613,066 A | 10/1971 | Cooreman |
| 3,764,813 A | 10/1973 | Clement et al. |
| 3,775,560 A | 11/1973 | Ebeling et al. |
| 3,810,804 A | 5/1974 | Rowland |
| 3,830,682 A | 8/1974 | Rowland |
| 3,857,022 A | 12/1974 | Rebane et al. |

(Continued)

FOREIGN PATENT DOCUMENTS

| | | |
|---|---|---|
| AU | 7225001 | 1/2002 |
| AU | 2003233728 | 12/2003 |

(Continued)

OTHER PUBLICATIONS

International Application Serial No. PCT/US2008/074755, International Search Report and Written Opinion mailed Jan. 29, 2009, 28 pages.

(Continued)

*Primary Examiner* — Michael Pervan
(74) *Attorney, Agent, or Firm* — Kilpatrick Townsend & Stockton LLP

(57) ABSTRACT

In an optical touch display system, light from a primary source can be retroreflected to a detector in the absence of an object in the detection area. When an object is present, its position can be triangulated based on the direction of its shadows at the detectors. Accuracy can be improved with a secondary light source positioned off-axis from the primary light sources so that minimal light from the secondary source is retroreflected to the detectors. Instead, when an object is present, light from the secondary source may be reflected directly from the object. Each detector signal representing light due to the primary light source can be corrected to remove light reflected directly from the object based on identifying and removing a signal component representing light from the secondary light source. In some embodiments, this is facilitated by phasing the primary and secondary light sources.

17 Claims, 7 Drawing Sheets

U.S. PATENT DOCUMENTS

| | | |
|---|---|---|
| 3,860,754 A | 1/1975 | Johnson et al. |
| 4,107,522 A | 8/1978 | Walter |
| 4,144,449 A | 3/1979 | Funk et al. |
| 4,243,618 A | 1/1981 | Van Arnam |
| 4,243,879 A | 1/1981 | Carroll et al. |
| 4,247,767 A | 1/1981 | O'Brien et al. |
| 4,329,037 A | 5/1982 | Caviness |
| 4,420,261 A | 12/1983 | Barlow et al. |
| 4,459,476 A | 7/1984 | Weissmueller et al. |
| 4,468,694 A | 8/1984 | Edgar |
| 4,486,363 A | 12/1984 | Pricone et al. |
| 4,507,557 A | 3/1985 | Tsikos et al. |
| 4,542,375 A | 9/1985 | Alles et al. |
| 4,550,250 A | 10/1985 | Mueller et al. |
| 4,553,842 A | 11/1985 | Griffin |
| 4,558,313 A | 12/1985 | Garwin et al. |
| 4,601,861 A | 7/1986 | Pricone et al. |
| 4,672,364 A | 6/1987 | Lucas |
| 4,673,918 A | 6/1987 | Adler et al. |
| 4,688,933 A | 8/1987 | Lapeyre |
| 4,703,316 A | 10/1987 | Sherbeck |
| 4,710,760 A | 12/1987 | Kasday |
| 4,737,631 A | 4/1988 | Sasaki et al. |
| 4,742,221 A | 5/1988 | Sasaki et al. |
| 4,746,770 A | 5/1988 | McAvinney |
| 4,762,990 A | 8/1988 | Caswell et al. |
| 4,766,424 A | 8/1988 | Adler et al. |
| 4,782,328 A | 11/1988 | Denlinger |
| 4,811,004 A | 3/1989 | Person et al. |
| 4,818,826 A | 4/1989 | Kimura |
| 4,820,050 A | 4/1989 | Griffin |
| 4,822,145 A | 4/1989 | Staelin |
| 4,831,455 A | 5/1989 | Ishikawa et al. |
| 4,851,664 A | 7/1989 | Rieger |
| 4,868,551 A | 9/1989 | Arditty et al. |
| 4,868,912 A | 9/1989 | Doering |
| 4,888,479 A | 12/1989 | Tamaru |
| 4,893,120 A | 1/1990 | Doering et al. |
| 4,916,308 A | 4/1990 | Meadows |
| 4,928,094 A | 5/1990 | Smith |
| 4,943,806 A | 7/1990 | Masters et al. |
| 4,980,547 A | 12/1990 | Griffin |
| 4,990,901 A | 2/1991 | Beiswenger |
| 5,025,314 A | 6/1991 | Tang et al. |
| 5,025,411 A | 6/1991 | Tallman et al. |
| 5,043,751 A | 8/1991 | Rice |
| 5,097,516 A | 3/1992 | Amir |
| 5,103,085 A | 4/1992 | Zimmerman |
| 5,103,249 A | 4/1992 | Keene |
| 5,105,186 A | 4/1992 | May |
| 5,109,435 A | 4/1992 | Lo et al. |
| 5,130,794 A | 7/1992 | Ritchey |
| 5,140,647 A | 8/1992 | Ise et al. |
| 5,148,015 A | 9/1992 | Dolan |
| 5,162,618 A | 11/1992 | Knowles |
| 5,162,783 A | 11/1992 | Moreno |
| 5,164,714 A | 11/1992 | Wehrer |
| 5,168,531 A | 12/1992 | Sigel |
| 5,177,328 A | 1/1993 | Ito et al. |
| 5,179,369 A | 1/1993 | Person et al. |
| 5,196,835 A | 3/1993 | Blue et al. |
| 5,196,836 A | 3/1993 | Williams |
| 5,200,851 A | 4/1993 | Coderre et al. |
| 5,200,861 A | 4/1993 | Moskovich |
| 5,233,502 A | 8/1993 | Beatty et al. |
| 5,239,152 A | 8/1993 | Caldwell et al. |
| 5,239,373 A | 8/1993 | Tang et al. |
| 5,272,470 A | 12/1993 | Zetts |
| 5,317,140 A | 5/1994 | Dunthorn |
| 5,359,155 A | 10/1994 | Helser |
| 5,374,971 A | 12/1994 | Clapp et al. |
| 5,414,413 A | 5/1995 | Tamaru et al. |
| 5,422,494 A | 6/1995 | West et al. |
| 5,448,263 A | 9/1995 | Martin |
| 5,457,289 A | 10/1995 | Huang et al. |
| 5,483,261 A | 1/1996 | Yasutake |
| 5,483,603 A | 1/1996 | Luke et al. |
| 5,484,966 A | 1/1996 | Segen |
| 5,490,655 A | 2/1996 | Bates |
| 5,502,568 A | 3/1996 | Ogawa et al. |
| 5,525,764 A | 6/1996 | Junkins et al. |
| 5,528,263 A | 6/1996 | Platzker et al. |
| 5,528,290 A | 6/1996 | Saund |
| 5,537,107 A | 7/1996 | Funado |
| 5,541,372 A | 7/1996 | Baller et al. |
| 5,554,828 A | 9/1996 | Primm |
| 5,581,276 A | 12/1996 | Cipolla et al. |
| 5,581,637 A | 12/1996 | Cass et al. |
| 5,591,945 A | 1/1997 | Kent |
| 5,594,469 A | 1/1997 | Freeman et al. |
| 5,594,502 A | 1/1997 | Bito et al. |
| 5,617,312 A | 4/1997 | Iura et al. |
| 5,638,092 A | 6/1997 | Eng et al. |
| 5,670,755 A | 9/1997 | Kwon |
| 5,686,942 A | 11/1997 | Ball |
| 5,698,845 A | 12/1997 | Kodama et al. |
| 5,712,024 A | 1/1998 | Okuzaki et al. |
| 5,729,704 A | 3/1998 | Stone et al. |
| 5,734,375 A | 3/1998 | Knox et al. |
| 5,736,686 A | 4/1998 | Perret, Jr. et al. |
| 5,737,740 A | 4/1998 | Henderson et al. |
| 5,739,479 A | 4/1998 | Davis-Cannon et al. |
| 5,745,116 A | 4/1998 | Pisutha-Arnond |
| 5,764,223 A | 6/1998 | Chang et al. |
| 5,771,039 A | 6/1998 | Ditzik |
| 5,784,054 A | 7/1998 | Armstrong et al. |
| 5,785,439 A | 7/1998 | Bowen |
| 5,786,810 A | 7/1998 | Knox et al. |
| 5,790,910 A | 8/1998 | Haskin |
| 5,801,704 A | 9/1998 | Oohara et al. |
| 5,804,773 A | 9/1998 | Wilson et al. |
| 5,818,421 A | 10/1998 | Ogino et al. |
| 5,818,424 A | 10/1998 | Korth |
| 5,819,201 A | 10/1998 | DeGraaf |
| 5,825,352 A | 10/1998 | Bisset et al. |
| 5,831,602 A | 11/1998 | Sato et al. |
| 5,877,459 A | 3/1999 | Prater |
| 5,909,210 A | 6/1999 | Knox et al. |
| 5,911,004 A | 6/1999 | Ohuchi et al. |
| 5,914,709 A | 6/1999 | Graham et al. |
| 5,920,342 A | 7/1999 | Umeda et al. |
| 5,936,615 A | 8/1999 | Waters |
| 5,936,770 A | 8/1999 | Nestegard et al. |
| 5,940,065 A | 8/1999 | Babb et al. |
| 5,943,783 A | 8/1999 | Jackson |
| 5,963,199 A | 10/1999 | Kato et al. |
| 5,982,352 A | 11/1999 | Pryor |
| 5,988,645 A | 11/1999 | Downing |
| 5,990,874 A | 11/1999 | Tsumura et al. |
| 6,002,808 A | 12/1999 | Freeman |
| 6,008,798 A | 12/1999 | Mato, Jr. et al. |
| 6,015,214 A | 1/2000 | Heenan et al. |
| 6,020,878 A | 2/2000 | Robinson |
| 6,031,524 A | 2/2000 | Kunert |
| 6,031,531 A | 2/2000 | Kimble |
| 6,061,177 A | 5/2000 | Fujimoto |
| 6,067,080 A | 5/2000 | Holtzman |
| 6,075,905 A | 6/2000 | Herman et al. |
| 6,076,041 A | 6/2000 | Watanabe |
| 6,091,406 A | 7/2000 | Kambara et al. |
| 6,100,538 A | 8/2000 | Ogawa |
| 6,104,387 A | 8/2000 | Chery et al. |
| 6,118,433 A | 9/2000 | Jenkin et al. |
| 6,122,865 A | 9/2000 | Branc et al. |
| 6,128,003 A | 10/2000 | Smith et al. |
| 6,141,000 A | 10/2000 | Martin |
| 6,147,678 A | 11/2000 | Kumar et al. |
| 6,153,836 A | 11/2000 | Goszyk |
| 6,161,066 A | 12/2000 | Wright et al. |
| 6,179,426 B1 | 1/2001 | Rodriquez, Jr. et al. |
| 6,188,388 B1 | 2/2001 | Arita et al. |
| 6,191,773 B1 | 2/2001 | Maruno et al. |
| 6,208,329 B1 | 3/2001 | Ballare |
| 6,208,330 B1 | 3/2001 | Hasegawa et al. |
| 6,209,266 B1 | 4/2001 | Branc et al. |
| 6,215,477 B1 | 4/2001 | Morrison et al. |
| 6,222,175 B1 | 4/2001 | Krymski |

| | | |
|---|---|---|
| 6,226,035 B1 | 5/2001 | Korein et al. |
| 6,229,529 B1 | 5/2001 | Yano et al. |
| 6,252,989 B1 | 6/2001 | Geisler et al. |
| 6,256,033 B1 | 7/2001 | Nguyen |
| 6,262,718 B1 | 7/2001 | Findlay et al. |
| 6,285,359 B1 | 9/2001 | Ogasawara et al. |
| 6,310,610 B1 | 10/2001 | Beaton et al. |
| 6,320,597 B1 | 11/2001 | Ieperen |
| 6,323,846 B1 | 11/2001 | Westerman et al. |
| 6,326,954 B1 | 12/2001 | Van Ieperen |
| 6,328,270 B1 | 12/2001 | Elberbaum |
| 6,335,724 B1 | 1/2002 | Takekawa et al. |
| 6,337,681 B1 | 1/2002 | Martin |
| 6,339,748 B1 | 1/2002 | Hiramatsu |
| 6,346,966 B1 | 2/2002 | Toh |
| 6,352,351 B1 | 3/2002 | Ogasahara et al. |
| 6,353,434 B1 | 3/2002 | Akebi et al. |
| 6,359,612 B1 | 3/2002 | Peter et al. |
| 6,362,468 B1 | 3/2002 | Murakami et al. |
| 6,377,228 B1 | 4/2002 | Jenkin et al. |
| 6,384,743 B1 | 5/2002 | Vanderheiden |
| 6,406,758 B1 | 6/2002 | Bottari et al. |
| 6,414,671 B1 | 7/2002 | Gillespie et al. |
| 6,414,673 B1 | 7/2002 | Wood et al. |
| 6,421,042 B1 | 7/2002 | Omura et al. |
| 6,427,389 B1 | 8/2002 | Branc et al. |
| 6,429,856 B1 | 8/2002 | Omura et al. |
| 6,429,857 B1 | 8/2002 | Masters et al. |
| 6,480,187 B1 | 11/2002 | Sano et al. |
| 6,496,122 B2 | 12/2002 | Sampsell |
| 6,497,608 B2 | 12/2002 | Ho et al. |
| 6,498,602 B1 | 12/2002 | Ogawa |
| 6,501,461 B2 | 12/2002 | Holtzman |
| 6,504,532 B1 | 1/2003 | Ogasahara et al. |
| 6,507,339 B1 | 1/2003 | Tanaka |
| 6,512,838 B1 | 1/2003 | Rafii et al. |
| 6,517,266 B2 | 2/2003 | Saund |
| 6,518,600 B1 | 2/2003 | Shaddock |
| 6,518,960 B2 | 2/2003 | Omura et al. |
| 6,522,830 B2 | 2/2003 | Yamagami |
| 6,529,189 B1 | 3/2003 | Colgan et al. |
| 6,530,664 B2 | 3/2003 | Vanderwerf et al. |
| 6,531,999 B1 | 3/2003 | Trajkovic |
| 6,532,006 B1 | 3/2003 | Takekawa et al. |
| 6,537,673 B2 | 3/2003 | Sada et al. |
| 6,540,366 B2 | 4/2003 | Keenan et al. |
| 6,540,679 B2 | 4/2003 | Slayton et al. |
| 6,545,669 B1 | 4/2003 | Kinawi et al. |
| 6,559,813 B1 | 5/2003 | DeLuca et al. |
| 6,563,491 B1 | 5/2003 | Omura |
| 6,567,078 B2 | 5/2003 | Ogawa |
| 6,567,121 B1 | 5/2003 | Kuno |
| 6,570,103 B1 | 5/2003 | Saka et al. |
| 6,570,612 B1 | 5/2003 | Saund et al. |
| 6,577,299 B1 | 6/2003 | Schiller et al. |
| 6,587,099 B2 | 7/2003 | Takekawa |
| 6,590,568 B1 | 7/2003 | Astala et al. |
| 6,594,023 B1 | 7/2003 | Omura et al. |
| 6,597,348 B1 | 7/2003 | Yamazaki et al. |
| 6,597,508 B2 | 7/2003 | Seino et al. |
| 6,603,867 B1 | 8/2003 | Sugino et al. |
| 6,608,619 B2 | 8/2003 | Omura et al. |
| 6,614,422 B1 | 9/2003 | Rafii et al. |
| 6,624,833 B1 | 9/2003 | Kumar et al. |
| 6,626,718 B2 | 9/2003 | Hiroki |
| 6,630,922 B2 | 10/2003 | Fishkin et al. |
| 6,633,328 B1 | 10/2003 | Byrd et al. |
| 6,650,318 B1 | 11/2003 | Arnon |
| 6,650,822 B1 | 11/2003 | Zhou |
| 6,664,952 B2 | 12/2003 | Iwamoto et al. |
| 6,670,985 B2 | 12/2003 | Karube et al. |
| 6,674,424 B1 | 1/2004 | Fujioka |
| 6,683,584 B2 | 1/2004 | Ronzani et al. |
| 6,690,357 B1 | 2/2004 | Dunton et al. |
| 6,690,363 B2 | 2/2004 | Newton |
| 6,690,397 B1 | 2/2004 | Daignault, Jr. |
| 6,710,770 B2 | 3/2004 | Tomasi et al. |
| 6,714,311 B2 | 3/2004 | Hashimoto |
| 6,720,949 B1 | 4/2004 | Pryor et al. |
| 6,727,885 B1 | 4/2004 | Ishino et al. |
| 6,736,321 B2 | 5/2004 | Tsikos et al. |
| 6,738,051 B2 | 5/2004 | Boyd et al. |
| 6,741,250 B1 | 5/2004 | Furlan et al. |
| 6,741,267 B1 | 5/2004 | Leperen |
| 6,747,636 B2 | 6/2004 | Martin |
| 6,756,910 B2 | 6/2004 | Ohba et al. |
| 6,760,009 B2 | 7/2004 | Omura et al. |
| 6,760,999 B2 | 7/2004 | Branc et al. |
| 6,767,102 B1 | 7/2004 | Heenan et al. |
| 6,774,889 B1 | 8/2004 | Zhang et al. |
| 6,803,906 B1 | 10/2004 | Morrison et al. |
| 6,828,959 B2 | 12/2004 | Takekawa et al. |
| 6,864,882 B2 | 3/2005 | Newton |
| 6,909,425 B2 | 6/2005 | Matsuda et al. |
| 6,911,972 B2 | 6/2005 | Brinjes |
| 6,919,880 B2 | 7/2005 | Morrison et al. |
| 6,927,384 B2 * | 8/2005 | Reime et al. .................. 250/221 |
| 6,933,981 B1 | 8/2005 | Kishida et al. |
| 6,947,029 B2 | 9/2005 | Katagiri et al. |
| 6,947,032 B2 | 9/2005 | Morrison et al. |
| 6,952,202 B2 | 10/2005 | Hirabayashi |
| 6,954,197 B2 | 10/2005 | Morrison et al. |
| 6,972,401 B2 | 12/2005 | Akitt et al. |
| 6,972,753 B1 | 12/2005 | Kimura et al. |
| 7,002,555 B1 | 2/2006 | Jacobsen et al. |
| 7,007,236 B2 | 2/2006 | Dempski et al. |
| 7,015,418 B2 | 3/2006 | Cahill et al. |
| 7,030,861 B1 | 4/2006 | Westerman et al. |
| 7,057,647 B1 | 6/2006 | Monroe |
| 7,058,204 B2 | 6/2006 | Hildreth et al. |
| 7,075,054 B2 | 7/2006 | Iwamoto et al. |
| 7,084,857 B2 | 8/2006 | Lieberman et al. |
| 7,084,868 B2 | 8/2006 | Farag et al. |
| 7,098,392 B2 | 8/2006 | Sitrick et al. |
| 7,113,174 B1 | 9/2006 | Takekawa et al. |
| 7,121,470 B2 | 10/2006 | McCall et al. |
| 7,133,032 B2 | 11/2006 | Cok |
| 7,151,533 B2 | 12/2006 | Van Ieperen |
| 7,176,904 B2 | 2/2007 | Satoh |
| 7,184,030 B2 | 2/2007 | McCharles et al. |
| 7,187,489 B2 | 3/2007 | Miles |
| 7,190,496 B2 | 3/2007 | Klug et al. |
| 7,202,860 B2 | 4/2007 | Ogawa |
| 7,227,526 B2 | 6/2007 | Hildreth et al. |
| 7,230,608 B2 | 6/2007 | Cok |
| 7,232,986 B2 | 6/2007 | Worthington et al. |
| 7,236,132 B1 | 6/2007 | Lin et al. |
| 7,236,154 B1 | 6/2007 | Kerr et al. |
| 7,236,162 B2 | 6/2007 | Morrison et al. |
| 7,237,937 B2 | 7/2007 | Kawashima et al. |
| 7,242,388 B2 | 7/2007 | Lieberman et al. |
| 7,265,748 B2 | 9/2007 | Ryynanen |
| 7,268,692 B1 | 9/2007 | Lieberman |
| 7,274,356 B2 | 9/2007 | Ung et al. |
| 7,283,126 B2 | 10/2007 | Leung |
| 7,283,128 B2 | 10/2007 | Sato |
| 7,289,113 B2 | 10/2007 | Martin |
| 7,302,156 B1 | 11/2007 | Lieberman et al. |
| 7,305,368 B2 | 12/2007 | Lieberman et al. |
| 7,330,184 B2 | 2/2008 | Leung |
| 7,333,094 B2 | 2/2008 | Lieberman et al. |
| 7,333,095 B1 | 2/2008 | Liberman et al. |
| 7,355,593 B2 | 4/2008 | Hill et al. |
| 7,372,456 B2 | 5/2008 | McLintock |
| 7,375,720 B2 | 5/2008 | Tanaka |
| RE40,368 E | 6/2008 | Arnon |
| 7,411,575 B2 | 8/2008 | Hill et al. |
| 7,414,617 B2 | 8/2008 | Ogawa |
| 7,432,914 B2 | 10/2008 | Kobayashi et al. |
| 7,460,110 B2 | 12/2008 | Ung et al. |
| 7,477,241 B2 | 1/2009 | Lieberman et al. |
| 7,479,949 B2 | 1/2009 | Jobs et al. |
| 7,492,357 B2 | 2/2009 | Morrison et al. |
| 7,499,037 B2 | 3/2009 | Lube |
| 7,515,138 B2 | 4/2009 | Sullivan |
| 7,515,141 B2 | 4/2009 | Kobayashi |
| 7,522,156 B2 | 4/2009 | Sano et al. |
| 7,538,759 B2 | 5/2009 | Newton |

| | | | | | | |
|---|---|---|---|---|---|---|
| 7,557,935 | B2 | 7/2009 | Baruch | 2005/0190162 A1 | 9/2005 | Newton |
| 7,559,664 | B1 | 7/2009 | Walleman et al. | 2005/0218297 A1 | 10/2005 | Suda et al. |
| 7,619,617 | B2 | 11/2009 | Morrison et al. | 2005/0241929 A1 | 11/2005 | Auger et al. |
| 7,629,967 | B2 | 12/2009 | Newton | 2005/0243070 A1 | 11/2005 | Ung et al. |
| 7,692,625 | B2 | 4/2010 | Morrison et al. | 2005/0248539 A1 | 11/2005 | Morrison et al. |
| 7,751,671 | B1 | 7/2010 | Newton et al. | 2005/0248540 A1 | 11/2005 | Newton |
| 7,755,613 | B2 | 7/2010 | Morrison et al. | 2005/0270781 A1 | 12/2005 | Marks |
| 7,777,732 | B2 | 8/2010 | Herz et al. | 2005/0276448 A1 | 12/2005 | Pryor |
| 7,781,722 | B2 | 8/2010 | Lieberman et al. | 2006/0012579 A1 | 1/2006 | Sato |
| 2001/0019325 | A1 | 9/2001 | Takekawa | 2006/0022962 A1 | 2/2006 | Morrison et al. |
| 2001/0022579 | A1 | 9/2001 | Hirabayashi | 2006/0028456 A1 | 2/2006 | Kang |
| 2001/0026268 | A1 | 10/2001 | Ito | 2006/0033751 A1 | 2/2006 | Keely et al. |
| 2001/0033274 | A1 | 10/2001 | Ong | 2006/0034486 A1 | 2/2006 | Morrison et al. |
| 2001/0048169 | A1 | 12/2001 | Nilsen et al. | 2006/0070187 A1 | 4/2006 | Chilson |
| 2001/0050677 | A1 | 12/2001 | Tosaya | 2006/0132432 A1 | 6/2006 | Bell |
| 2001/0055006 | A1 | 12/2001 | Sano et al. | 2006/0139314 A1 | 6/2006 | Bell |
| 2002/0008692 | A1 | 1/2002 | Omura et al. | 2006/0152500 A1 | 7/2006 | Weng |
| 2002/0015159 | A1 | 2/2002 | Hashimoto | 2006/0158437 A1 | 7/2006 | Blythe et al. |
| 2002/0036617 | A1 | 3/2002 | Pryor | 2006/0170658 A1 | 8/2006 | Nakamura et al. |
| 2002/0041327 | A1 | 4/2002 | Hildreth et al. | 2006/0197749 A1 | 9/2006 | Popovich |
| 2002/0050979 | A1 | 5/2002 | Oberoi et al. | 2006/0202953 A1 | 9/2006 | Pryor et al. |
| 2002/0064382 | A1 | 5/2002 | Hildreth et al. | 2006/0202974 A1 | 9/2006 | Thielman |
| 2002/0067922 | A1 | 6/2002 | Harris | 2006/0227120 A1 | 10/2006 | Eikman |
| 2002/0075243 | A1 | 6/2002 | Newton | 2006/0232568 A1 | 10/2006 | Tanaka et al. |
| 2002/0080123 | A1 | 6/2002 | Kennedy et al. | 2006/0232830 A1 | 10/2006 | Kobayashi |
| 2002/0118177 | A1 | 8/2002 | Newton | 2006/0244734 A1 | 11/2006 | Hill et al. |
| 2002/0145595 | A1 | 10/2002 | Satoh | 2006/0274067 A1 | 12/2006 | Hidai |
| 2002/0145596 | A1 | 10/2002 | Vardi | 2006/0279558 A1 | 12/2006 | Van Delden et al. |
| 2002/0163505 | A1 | 11/2002 | Takekawa | 2006/0284858 A1 | 12/2006 | Rekimoto |
| 2002/0163530 | A1 | 11/2002 | Takakura et al. | 2007/0002028 A1 | 1/2007 | Morrison et al. |
| 2003/0001825 | A1 | 1/2003 | Omura et al. | 2007/0019103 A1 | 1/2007 | Lieberman et al. |
| 2003/0025951 | A1 | 2/2003 | Pollard et al. | 2007/0059520 A1 | 3/2007 | Hatin et al. |
| 2003/0034439 | A1 | 2/2003 | Reime et al. | 2007/0075648 A1 | 4/2007 | Blythe et al. |
| 2003/0043116 | A1 | 3/2003 | Morrison et al. | 2007/0075982 A1 | 4/2007 | Morrison et al. |
| 2003/0046401 | A1 | 3/2003 | Abbott et al. | 2007/0089915 A1 | 4/2007 | Ogawa et al. |
| 2003/0063073 | A1 | 4/2003 | Geaghan et al. | 2007/0116333 A1 | 5/2007 | Dempski et al. |
| 2003/0071858 | A1 | 4/2003 | Morohoshi | 2007/0126755 A1 | 6/2007 | Zhang et al. |
| 2003/0085871 | A1 | 5/2003 | Ogawa | 2007/0132742 A1 | 6/2007 | Chen et al. |
| 2003/0095112 | A1 | 5/2003 | Kawano et al. | 2007/0139932 A1 | 6/2007 | Sun et al. |
| 2003/0137494 | A1 | 7/2003 | Tulbert | 2007/0152977 A1 | 7/2007 | Ng et al. |
| 2003/0142880 | A1 | 7/2003 | Hyodo | 2007/0152984 A1 | 7/2007 | Ording et al. |
| 2003/0147016 | A1 | 8/2003 | Lin et al. | 2007/0152986 A1 | 7/2007 | Ogawa |
| 2003/0151532 | A1 | 8/2003 | Chen et al. | 2007/0160362 A1 | 7/2007 | Mitsuo et al. |
| 2003/0151562 | A1 | 8/2003 | Kulas | 2007/0165007 A1 | 7/2007 | Morrison et al. |
| 2003/0156118 | A1 | 8/2003 | Ayinde | 2007/0167709 A1 | 7/2007 | Slayton et al. |
| 2003/0161524 | A1 | 8/2003 | King | 2007/0205994 A1 | 9/2007 | Ieperen |
| 2003/0227492 | A1 | 12/2003 | Wilde et al. | 2007/0215451 A1 | 9/2007 | Sasloff et al. |
| 2004/0001144 | A1 | 1/2004 | McCharles et al. | 2007/0236454 A1 | 10/2007 | Ung et al. |
| 2004/0012573 | A1 | 1/2004 | Morrison et al. | 2007/0247435 A1 | 10/2007 | Benko et al. |
| 2004/0021633 | A1 | 2/2004 | Rajkowski | 2007/0273842 A1 | 11/2007 | Morrison et al. |
| 2004/0031779 | A1 | 2/2004 | Cahill et al. | 2008/0012835 A1 | 1/2008 | Rimon et al. |
| 2004/0032401 | A1 | 2/2004 | Nakazawa et al. | 2008/0029691 A1 | 2/2008 | Han |
| 2004/0046749 | A1 | 3/2004 | Ikeda | 2008/0042999 A1 | 2/2008 | Martin |
| 2004/0051709 | A1 | 3/2004 | Ogawa et al. | 2008/0055262 A1 | 3/2008 | Wu et al. |
| 2004/0108990 | A1 | 6/2004 | Lieberman et al. | 2008/0055267 A1 | 3/2008 | Wu et al. |
| 2004/0125086 | A1 | 7/2004 | Hagermoser et al. | 2008/0062140 A1 | 3/2008 | Hotelling et al. |
| 2004/0149892 | A1 | 8/2004 | Akitt et al. | 2008/0062149 A1 | 3/2008 | Baruk |
| 2004/0150630 | A1 | 8/2004 | Hinckley et al. | 2008/0068352 A1 | 3/2008 | Worthington et al. |
| 2004/0169639 | A1 | 9/2004 | Pate et al. | 2008/0083602 A1 | 4/2008 | Auger |
| 2004/0178993 | A1 | 9/2004 | Morrison et al. | 2008/0103267 A1 | 5/2008 | Hurst et al. |
| 2004/0178997 | A1 | 9/2004 | Gillespie et al. | 2008/0106706 A1 | 5/2008 | Holmgren et al. |
| 2004/0179001 | A1 | 9/2004 | Morrison et al. | 2008/0122803 A1 | 5/2008 | Izadi et al. |
| 2004/0189720 | A1 | 9/2004 | Wilson et al. | 2008/0129707 A1 | 6/2008 | Pryor |
| 2004/0201575 | A1 | 10/2004 | Morrison | 2008/0143682 A1 | 6/2008 | Shim et al. |
| 2004/0204129 | A1 | 10/2004 | Payne et al. | 2008/0150913 A1 | 6/2008 | Bell et al. |
| 2004/0218479 | A1 | 11/2004 | Iwamoto et al. | 2008/0158170 A1 | 7/2008 | Herz et al. |
| 2004/0221265 | A1 | 11/2004 | Leung et al. | 2008/0259050 A1 | 10/2008 | Lin et al. |
| 2004/0252091 | A1 | 12/2004 | Ma et al. | 2008/0259052 A1 | 10/2008 | Lin et al. |
| 2005/0020612 | A1 | 1/2005 | Gericke | 2008/0259053 A1 | 10/2008 | Newton |
| 2005/0030287 | A1 | 2/2005 | Sato | 2009/0030853 A1 | 1/2009 | De La Motte |
| 2005/0052427 | A1 | 3/2005 | Wu et al. | 2009/0058832 A1 | 3/2009 | Newton |
| 2005/0057524 | A1 | 3/2005 | Hill et al. | 2009/0058833 A1 | 3/2009 | Newton |
| 2005/0077452 | A1 | 4/2005 | Morrison et al. | 2009/0077504 A1 | 3/2009 | Bell et al. |
| 2005/0083308 | A1 | 4/2005 | Homer et al. | 2009/0122027 A1 | 5/2009 | Newton |
| 2005/0104860 | A1 | 5/2005 | McCreary et al. | 2009/0135162 A1 | 5/2009 | Van De Wijdeven et al. |
| 2005/0128190 | A1 | 6/2005 | Ryynanen | 2009/0141002 A1 | 6/2009 | Sohn et al. |
| 2005/0151733 | A1 | 7/2005 | Sander et al. | 2009/0146972 A1 | 6/2009 | Morrison et al. |
| 2005/0156900 | A1 | 7/2005 | Hill et al. | 2009/0207144 A1 | 8/2009 | Bridger |
| 2005/0178953 | A1 | 8/2005 | Worthington et al. | 2009/0213093 A1 | 8/2009 | Bridger |

| | | | | | | |
|---|---|---|---|---|---|---|
| 2009/0213094 A1 | 8/2009 | Bridger | | EP | 0125068 | 11/1984 |
| 2009/0219256 A1 | 9/2009 | Newton | | EP | 0181196 | 5/1986 |
| 2009/0237376 A1 | 9/2009 | Bridger | | EP | 0279652 | 8/1988 |
| 2009/0278816 A1 | 11/2009 | Colson | | EP | 0347725 | 12/1989 |
| 2009/0284495 A1 | 11/2009 | Geaghan et al. | | EP | 0420335 | 4/1991 |
| 2009/0295755 A1 | 12/2009 | Chapman et al. | | EP | 0657841 | 6/1995 |
| 2009/0309844 A1 | 12/2009 | Woo et al. | | EP | 0762319 | 3/1997 |
| 2009/0309853 A1 | 12/2009 | Hildebrandt et al. | | EP | 0829798 | 3/1998 |
| 2010/0009098 A1 | 1/2010 | Bai et al. | | EP | 0843202 | 5/1998 |
| 2010/0045629 A1 | 2/2010 | Newton | | EP | 0897161 | 2/1999 |
| 2010/0045634 A1 | 2/2010 | Su et al. | | EP | 0911721 | 4/1999 |
| 2010/0079412 A1 | 4/2010 | Chiang et al. | | EP | 1059605 | 12/2000 |
| 2010/0085330 A1 | 4/2010 | Newton | | EP | 1262909 | 12/2002 |
| 2010/0090985 A1 | 4/2010 | Newton | | EP | 1297488 | 4/2003 |
| 2010/0090987 A1 | 4/2010 | Lin et al. | | EP | 1420335 | 5/2004 |
| 2010/0097353 A1 | 4/2010 | Newton | | EP | 1450243 | 8/2004 |
| 2010/0103143 A1 | 4/2010 | Newton et al. | | EP | 1457870 | 9/2004 |
| 2010/0177052 A1 | 7/2010 | Chang et al. | | EP | 1471459 | 10/2004 |
| 2010/0182279 A1 | 7/2010 | Juni | | EP | 1517228 | 3/2005 |
| 2010/0193259 A1 | 8/2010 | Wassvik | | EP | 1550940 | 7/2005 |
| 2010/0207911 A1 | 8/2010 | Newton | | EP | 1577745 | 9/2005 |
| 2010/0225588 A1 | 9/2010 | Newton et al. | | EP | 1599789 | 11/2005 |
| 2010/0229090 A1 | 9/2010 | Newton et al. | | EP | 1611503 | 1/2006 |
| 2010/0315379 A1 | 12/2010 | Allard et al. | | EP | 1674977 | 6/2006 |
| 2011/0019204 A1 | 1/2011 | Bridger | | EP | 1736856 | 12/2006 |
| 2011/0050649 A1 | 3/2011 | Newton et al. | | EP | 1739528 | 1/2007 |
| 2011/0199335 A1 | 8/2011 | Li et al. | | EP | 1739529 | 1/2007 |
| 2011/0199387 A1 | 8/2011 | Newton | | EP | 1741186 | 1/2007 |
| 2011/0205151 A1 | 8/2011 | Newton et al. | | EP | 1759378 | 3/2007 |
| 2011/0205155 A1 | 8/2011 | Newton et al. | | EP | 1766501 | 3/2007 |
| 2011/0205185 A1 | 8/2011 | Newton et al. | | EP | 1830248 | 9/2007 |
| 2011/0205186 A1 | 8/2011 | Newton et al. | | EP | 1877893 | 1/2008 |
| | | | | EP | 2135155 | 12/2009 |

FOREIGN PATENT DOCUMENTS

| | | | | | |
|---|---|---|---|---|---|
| | | | EP | 2195726 | 6/2010 |
| AU | 2004211738 | 8/2004 | EP | 2250546 | 11/2010 |
| AU | 2006243730 | 11/2006 | ES | 2279823 | 9/2007 |
| CA | 2058219 | 4/1993 | FR | 2521330 | 8/1983 |
| CA | 2367864 | 4/1993 | GB | 1575420 | 9/1980 |
| CA | 2219886 | 4/1999 | GB | 2176282 | 5/1986 |
| CA | 2251221 | 4/1999 | GB | 2204126 | 11/1988 |
| CA | 2267733 | 10/1999 | GB | 2263765 | 8/1993 |
| CA | 2268208 | 10/1999 | JP | 57211637 | 12/1982 |
| CA | 2252302 | 4/2000 | JP | 58146928 | 9/1983 |
| CA | 2412878 | 1/2002 | JP | 61196317 | 8/1986 |
| CA | 2341918 | 9/2002 | JP | 61260322 | 11/1986 |
| CA | 2350152 | 12/2002 | JP | 62-005428 | 1/1987 |
| CA | 2386094 | 12/2002 | JP | 63223819 | 9/1988 |
| CA | 2372868 | 8/2003 | JP | 1061736 | 3/1989 |
| CA | 2390503 | 12/2003 | JP | 1154421 | 6/1989 |
| CA | 2390506 | 12/2003 | JP | 3054618 | 3/1991 |
| CA | 2432770 | 12/2003 | JP | 3244017 | 10/1991 |
| CA | 2493236 | 12/2003 | JP | 4350715 | 12/1992 |
| CA | 2448603 | 5/2004 | JP | 4355815 | 12/1992 |
| CA | 2453873 | 7/2004 | JP | 5181605 | 7/1993 |
| CA | 2460449 | 9/2004 | JP | 5189137 | 7/1993 |
| CA | 2521418 | 10/2004 | JP | 5197810 | 8/1993 |
| CA | 2481396 | 3/2005 | JP | 6110608 | 4/1994 |
| CA | 2491582 | 7/2005 | JP | 7110733 | 4/1995 |
| CA | 2563566 | 11/2005 | JP | 7160403 | 6/1995 |
| CA | 2564262 | 11/2005 | JP | 7230352 | 8/1995 |
| CA | 2501214 | 9/2006 | JP | 8016931 | 2/1996 |
| CA | 2606863 | 11/2006 | JP | 8108689 | 4/1996 |
| CA | 2580046 | 9/2007 | JP | 8506193 | 7/1996 |
| CA | 2515955 | 1/2011 | JP | 8240407 | 9/1996 |
| CN | 1277349 | 12/2000 | JP | 8315152 | 11/1996 |
| CN | 1407506 | 4/2003 | JP | 9091094 | 4/1997 |
| CN | 1440539 | 9/2003 | JP | 9224111 | 8/1997 |
| CN | 1774692 | 5/2006 | JP | 9319501 | 12/1997 |
| CN | 1784649 | 6/2006 | JP | 10031546 | 2/1998 |
| CN | 1310126 | 4/2007 | JP | 10105324 | 4/1998 |
| CN | 101019096 | 8/2007 | JP | 10162698 | 6/1998 |
| CN | 101023582 | 8/2007 | JP | 10254623 | 9/1998 |
| CN | 101663637 | 3/2010 | JP | 11045155 | 2/1999 |
| CN | 101802759 | 8/2010 | JP | 11051644 | 2/1999 |
| CN | 101802760 | 8/2010 | JP | 11064026 | 3/1999 |
| DE | 3836429 | 5/1990 | JP | 11085376 | 3/1999 |
| DE | 19810452 | 12/1998 | JP | 11110116 | 4/1999 |
| DE | 60124549 | 9/2007 | JP | 11203042 | 7/1999 |
| DE | 102007021537 | 6/2008 | JP | 11212692 | 8/1999 |

| | | |
|---|---|---|
| JP | 11338687 | 12/1999 |
| JP | 2000105671 | 4/2000 |
| JP | 2000132340 | 5/2000 |
| JP | 2000259347 | 9/2000 |
| JP | 2001014091 | 1/2001 |
| JP | 2001075735 | 3/2001 |
| JP | 2001142642 | 5/2001 |
| JP | 2001166874 | 6/2001 |
| JP | 2001282445 | 10/2001 |
| JP | 2001282456 | 10/2001 |
| JP | 2001282457 | 10/2001 |
| JP | 2002055770 | 2/2002 |
| JP | 2002116428 | 4/2002 |
| JP | 2002196874 | 7/2002 |
| JP | 2002236547 | 8/2002 |
| JP | 2002287886 | 10/2002 |
| JP | 200365716 | 3/2003 |
| JP | 2003158597 | 5/2003 |
| JP | 2003167669 | 6/2003 |
| JP | 2003173237 | 6/2003 |
| JP | 2003303046 | 10/2003 |
| JP | 2003533786 | 11/2003 |
| JP | 2004030003 | 1/2004 |
| JP | 2004502261 | 1/2004 |
| JP | 2005108211 | 4/2005 |
| JP | 2005182423 | 7/2005 |
| JP | 2005202950 | 7/2005 |
| JP | 2006522967 | 10/2006 |
| JP | 2007536652 | 12/2007 |
| KR | 1020050111324 | 11/2005 |
| WO | WO8901677 | 2/1989 |
| WO | WO9807112 | 2/1998 |
| WO | WO9908897 | 2/1999 |
| WO | WO9921122 | 4/1999 |
| WO | WO9928812 | 6/1999 |
| WO | WO9936805 | 7/1999 |
| WO | WO9940562 | 8/1999 |
| WO | WO0021023 | 4/2000 |
| WO | WO0124157 | 4/2001 |
| WO | WO0131570 | 5/2001 |
| WO | WO0163550 | 8/2001 |
| WO | WO0186586 | 11/2001 |
| WO | WO0191043 | 11/2001 |
| WO | WO0203316 | 1/2002 |
| WO | WO0207073 | 1/2002 |
| WO | WO0208881 | 1/2002 |
| WO | WO0221502 | 3/2002 |
| WO | WO0227461 | 4/2002 |
| WO | WO03104887 | 12/2003 |
| WO | WO03105074 | 12/2003 |
| WO | WO2004072843 | 8/2004 |
| WO | WO2004090706 | 10/2004 |
| WO | WO2004102523 | 11/2004 |
| WO | WO2004104810 | 12/2004 |
| WO | WO2005031554 | 4/2005 |
| WO | WO2005034027 | 4/2005 |
| WO | WO-2005106775 | 11/2005 |
| WO | WO2005107072 | 11/2005 |
| WO | WO2005109396 | 11/2005 |
| WO | WO2006002544 | 1/2006 |
| WO | WO2006092058 | 9/2006 |
| WO | WO2006095320 | 9/2006 |
| WO | WO2006096962 | 9/2006 |
| WO | WO2006116869 | 11/2006 |
| WO | WO2007003196 | 1/2007 |
| WO | WO2007019600 | 2/2007 |
| WO | WO2007037809 | 4/2007 |
| WO | WO2007064804 | 6/2007 |
| WO | WO2007079590 | 7/2007 |
| WO | WO2007132033 | 11/2007 |
| WO | WO2007134456 | 11/2007 |
| WO | WO2008007276 | 1/2008 |
| WO | WO2008085789 | 7/2008 |
| WO | WO2008128096 | 10/2008 |
| WO | WO-2009029764 | 3/2009 |
| WO | WO-2009029767 | 3/2009 |
| WO | WO2009035705 | 3/2009 |
| WO | WO2009102681 | 8/2009 |
| WO | WO2009137355 | 11/2009 |
| WO | WO2009146544 | 12/2009 |
| WO | WO2010039663 | 4/2010 |
| WO | WO2010039932 | 4/2010 |
| WO | WO2010044575 | 4/2010 |
| WO | WO2010051633 | 5/2010 |
| WO | WO2010110681 | 9/2010 |
| WO | WO2010110683 | 9/2010 |

OTHER PUBLICATIONS

Co-pending U.S. Appl. No. 12/201,410, filed Aug. 29, 2008.
International Application Serial No. PCT/US2008/074749, Search Report & Written Opinion mailed Feb. 11, 2009, 15 pgs.
International Application Serial No. PCT/US2008/074755, Search Report & Written Opinion mailed Jan. 29, 2009, 13 pgs.
Chinese Patent Application No. 200880105040.5, Office Action, at least as early as Aug. 11, 2011, 6 pages. (English Translation Not Available).
Anon, "Smart Board Specifications Model 680i", XP7915047 Retrieved from the Internet: URL:http://www2.smarttech.com/kbdoc/74231 [retrieved on Sep. 23, 2010], 2008, pp. 1-5.
Benko, et al., "Precise Selection Techniques for Multi-Touch Screens", *Conference on Human Factors in Computing Systems—Proceedings 2006*, 2: 1263-1273.
Buxton, et al., "Issues and Techniques in Touch-Sensitive Tablet Input", *Computer Graphics, Proceedings of SIGGRAPH'85*, 1985, 19(3): 215-223.
Canadian Patent Application No. 2412878, Office Action, mailed May 12, 2009, 4 pages.
"Composite List of Projects 1983 to 1989", *NASA Small Business Innovation Research Program*, Aug. 1990, 132 pages.
"Digital Vision Touch Technology", White Paper, *SMART Technologies Inc.*, Feb. 2003, 10 pages.
European Application No. 02253594.2, European Search Report, mailed Jan. 5, 2006, 3 pages.
European Application No. 03257166.3, Partial European Search Report, mailed May 29, 2006, 4 pages.
European Application No. 04251392.9, European Search Report, mailed Jan. 18, 2007, 3 pages.
European Application No. 04711522.5, Office Action, mailed Jun. 29, 2010, 8 pages.
European Application No. 04711522.5, Office Action, mailed Mar. 22, 2010, 1 page.
European Application No. 04711522.5, Supplementary European Search Report, mailed Mar. 3, 2010, 3 pages.
European Application No. 06019268.9, European Search Report and Search Opinion, mailed Nov. 24, 2006, 5 pages.
European Application No. 06019269.7, European Search Report and Search Opinion, mailed Nov. 23, 2006, 5 pages.
European Application No. 07250888.0, European Search Report and Search Opinion, mailed Jun. 22, 2007, 6 pages.
European Application No. 07701682.2, Supplementary European Search Report and Search Opinion, mailed Dec. 7, 2010, 10 pages.
European Application No. 08745663.8, Office Action, mailed Dec. 27, 2010, 13 pages.
European Application No. 08745663.8, Office Action, mailed Jul. 6, 2010, 6 pages.
Förstner, "On Estimating Rotations", *Institut für Photogrammetrie, Universität Bonn*, 12 pages, 1999.
Fukushige, et al., "Interactive 3D Pointing Device Using Mirror Reflections", *Graduate School of Engineering, Osaka University*, 2006, 231-235.
Funk, "CCDs in optical touch panels deliver high resolution", *Electronic Design*, Sep. 27, 1980, pp. 139-143.
Geer, "Will Gesture-Recognition Technology Point the Way?", *Industry Trends*, Oct. 2004, 20-23.
Hartley, "Multiple View Geometry in Computer Vision", *Cambridge University Press* First published 2000, Reprinted (with corrections) 2001, pp. 70-73, 92-93, and 98-99.
Heddier Electronic, "Store Window Presentations", Feb. 2, 2011, 2 pages.

Herot, et al., "One-Point Touch Input of Vector Information for Computer Displays", *Architecture Machine Group Massachusetts Institute of Technology* Cambridge, Massachusetts, Oct. 31, 1977, pp. 210-216.
Herrero, et al., "Background Subtraction Techniques: Systematic Evaluation and Comparative Analysis", *Advanced Concepts for Intelligent Vision Systems*, Springer-Verlag Berlin Heidelberg, Sep. 2009, pp. 33-42.
Hu, et al., "Multiple-view 3-D Reconstruction Using a Mirror", *The University of Rochester*, May 2005, 14 pages.
International Application No. PCT/CA2001/00980, International Search Report, mailed Oct. 22, 2001, 3 pages.
International Application No. PCT/CA2004/001759, International Search Report and Written Opinion, mailed Feb. 21, 2005, 7 pages.
International Application No. PCT/CA2007/002184, International Search Report, mailed Mar. 13, 2008, 3 pages.
International Application No. PCT/CA2008/001350, International Search Report, mailed Oct. 17, 2008, 5 pages.
International Application No. PCT/CA2009/000733, International Search Report and Written Opinion, mailed Sep. 10, 2009, 6 pages.
International Application No. PCT/CA2010/001085, International Search Report, mailed Oct. 12, 2010, 4 pages.
International Application No. PCT/NZ2004/000029, International Preliminary Report on Patentability, issued May 20, 2005, 21 pages.
International Application No. PCT/NZ2004/000029, International Search Report and Written Opinion, mailed Jun. 10, 2004, 6 pages.
International Application No. PCT/NZ2005/000092, International Preliminary Report on Patentability, completed Dec. 30, 2006, 3 pages.
International Application No. PCT/NZ2005/000092, International Search Report, mailed Sep. 27, 2006, 4 pages.
International Application No. PCT/NZ2010/000049, International Search Report and Written Opinion, mailed Oct. 14, 2010, 12 pages.
International Application No. PCT/NZ2010/000051, International Search Report and Written Opinion, mailed Oct. 5, 2010, 15 pages.
International Application No. PCT/US2008/060102, International Preliminary Report on Patentability, mailed Oct. 22, 2009, 10 pages.
International Application No. PCT/US2008/060102, International Search Report and Written Opinion, mailed Feb. 12, 2009, 20 pages.
International Application No. PCT/US2008/074749, International Preliminary Report on Patentability, issuance Mar. 2, 2010, 9 pages.
International Application No. PCT/US2008/074755, International Preliminary Report on Patentability, issuance Mar. 2, 2010, 8 pages.
International Application No. PCT/US2009/030694, International Preliminary Report on Patentability, completion Apr. 26, 2010, 10 pages.
Internatibnal Application No. PCT/US2009/030694, International Search Report, mailed Aug. 5, 2009, 5 pages.
International Application No. PCT/US2009/033624, International Preliminary Report on Patentability and Written Opinion, issuance Aug. 17, 2010, 6 pages.
International Application No. PCT/US2009/033624, International Search Report, mailed Mar. 29, 2010, 3 pages.
International Application No. PCT/US2009/042547, International Preliminary Report on Patentability, mailed Nov. 9, 2010, 6 pages.
International Application No. PCT/US2009/042547, International Search Report and Written Opinion, mailed Sep. 2, 2010, 12 pages.
International Application No. PCT/US2009/058682, International Search Report and Written Opinion, mailed Apr. 27, 2010, 15 pages.
International Application No. PCT/US2009/059193, International Search Report and Written Opinion, mailed Dec. 7, 2009, 15 pages.
International Application No. PCT/US2010/059050, International Search Report and Written Opinion, mailed Mar. 23, 2011, 9 pages.
International Application No. PCT/US2010/059104, International Search Report and Written Opinion, mailed Jun. 6, 2011, 14 pages.
International Application No. PCT/US2010/059078, International Search Report and Written Opinion, mailed Aug. 2, 2011, 17 pages.
"Introducing the NextWindow 1900 Optical Touch Screen", *A NextWindow White Paper, Next Window Human Touch*, May 22, 2007, 13 pages.
IntuiFace Press Release, "IntuiLab introduces IntuiFace, an interactive table and its application platform", Nov. 30, 2007, 1 page.
IntuiLab, "Overview Page", Mar. 9, 2011, 1 page.
Japanese Patent Application No. 2005-000268, Office Action, mailed Jul. 5, 2010, Office Action—3 pages, English Translation—3 pages.
Japanese Patent Application No. 2006-502767, Office Action, mailed Jan. 20, 2009, Office Action—2 pages, English Translation—3 pages.
Japanese Patent Application No. 2006-502767, Office Action, mailed Jun. 22, 2010, Office Action—3 pages, English Translation—4 pages.
Japanese Patent Application No. 2007-511305, Office Action, mailed Feb. 1, 2011, Office Action—2 pages, English Translation—5 pages.
Japanese Patent Application No. 2007-511305, Office Action, mailed Sep. 6, 2011, Office Action—3 pages, English Translation—4 pages.
Kanatani, "Camera Calibration", *Geometric Computation for Machine Vision*, Oxford Engineering Science Series, 1993, 37(2): 56-63.
Korean Patent Application No. 10-2005-7014885, Office Action, dated Aug. 9, 2010, English Translation—5 pages.
Lane, et al., "Reflective Interaction in Virtual Environments", *Eurographics*, 2001, 20(3): 7 pages.
Lo, "Solid-state image sensor: technologies and applications", SPIE Proceedings, 1998, 3422: 70-80.
Loinaz, et al., "A 200-mW, 3.3-V, CMOS Color Camera IC Producing $352 \times 288$ 24-b Video at 30 Frames", *IEEE Journal of Solid-State Circuits*, Dec. 1998, 33(12); 2092-2103.
Piccardi, et al., "Background subtraction techniques: a review", *2004 IEEE International Conference on Systems, Man and Cybernetics*, Oct. 10, 2004, 4: 3099-3104.
Pogue, "The Multi-Touch Screen", *Pogue's Posts*, Mar. 27, 2007, 13 pages.
Singapore Patent Application No. 201001122-9, Office Action, dated May 3, 2011, 9 pages.
Tappert, et al., "On-Line Handwriting Recognition—A Survey", *Proceedings of the $9^{th}$ International Conference on Pattern Recognition (ICPR)*, Rome, IEEE Computer Society Press, Nov. 14-17, 1988, 2: 1123-1132.
"ThruGlass™ Projected Capacitive Touchscreens Specifications", *Micro Touch*, 2000, 4 pages.
"Touch Panel", *Veritas et Visus*, Nov. 2005, vol. 1, No. 1.
"Touch Panel", *Veritas et Visus*, Dec. 2005, Issue 2 of 10.
"Touch Panel", *Veritas et Visus*, Feb. 2006, vol. 1, No. 3.
"Touch Panel", *Veritas et Visus*, Mar. 2006, vol. 1, No. 4.
"Touch Panel", *Veritas et Visus*, May 2006, vol. 1, No. 5.
"Touch Panel", *Veritas et Visus*, Jun. 2006, vol. 1, No. 6.
"Touch Panel", *Veritas et Visus*, Jul. 2006, vol. 1, No. 7.
"Touch Panel", *Veritas et Visus*, Aug. 2006, vol. 1, No. 8.
"Touch Panel", *Veritas et Visus*, Oct. 2006, vol. 1, No. 9.
"Touch Panel", *Veritas et Visus*, Nov. 2006, vol. 1, No. 10.
"Touch Panel", *Veritas et Visus*, Dec. 2006, vol. 2, No. 1.
"Touch Panel", *Veritas et Visus*, Feb. 2007, vol. 2, No. 2.
"Touch Panel", *Veritas et Visus*, Mar. 2007, vol. 2, No. 3.
"Touch Panel", *Veritas et Visus*, May 2007, vol. 2, No. 4.
"Touch Panel", *Veritas et Visus*, Jul. 2007, vol. 2, No. 5.
"Touch Panel", *Veritas et Visus*, Oct. 2007, vol. 2, No. 6.
"Touch Panel", *Veritas et Visus*, Jan. 2008, vol. 2, Nos. 7-8.
"Touch Panel", *Veritas et Visus*, Mar. 2008, vol. 2, Nos. 9-10.
"Touch Panel", *Veritas et Visus*, Aug. 2008, vol. 3, Nos. 1-2.
"Touch Panel", *Veritas et Visus*, Nov. 2008, vol. 3, Nos. 3-4.
"Touch Panel", *Veritas et Visus*, Jan. 2009, vol. 3, Nos. 5-6.
"Touch Panel", *Veritas et Visus*, Mar. 2009, vol. 3, Nos. 7-8.
"Touch Panel", *Veritas et Visus*, May 2009, vol. 3, No. 9.
"Touch Panel", *Veritas et Visus*, Sep. 2009, vol. 4, Nos. 2-3.
"Touch Panel", *Veritas et Visus*, Sep. 2010, vol. 5, Nos. 2-3.
"Touch Panel", *Veritas et Visus*, Nov. 2010, vol. 5, No. 4.
Photobit Corporation, "VGA-format CMOS Camera-on-a-Chip for Multimedia Applications", 1999, 2 pages.
Villamor, et al., "Touch Gesture Reference Guide", Last updated Apr. 15, 2010, 7 pages.
Wang, et al., "Stereo camera calibration without absolute world coordinate information", *SPIE*, Jun. 14, 1995, 2620: 655-662.
Wrobel, et al., "Minimum Solutions for Orientation", *Calibration and Orientation of Cameras in Computer Vision, Springer Series in Information Sciences*, 2001, 34: 28-33.

\* cited by examiner

OPTICAL TOUCHSCREEN WITH IMPROVED ILLUMINATION

PRIORITY CLAIM

This application claims priority to New Zealand Provisional Patent Application No. 561,037, filed on Aug. 30, 2007, and entitled OPTICAL TOUCHSCREEN WITH IMPROVED ILLUMINATION, which is hereby incorporated by reference herein in its entirety.

TECHNICAL FIELD

The present subject matter generally pertains to touch display systems that allow a user to interact with one or more processing devices by touching on or near a surface.

BACKGROUND

Digitizers and tablets can be incorporated as a coordinate input apparatus in processing units. For instance, the digitizer or tablet can be used alongside one or more display devices (e.g. CRT, LCD, or other display technology) in a touch enabled display system. Generally speaking, various systems for detecting an angle (direction) or a position of an object relative to the display area can be used, such as pressure sensitive resistance membrane systems, capacitance systems, electromagnetic induction systems, and the like. As another example, optical systems capable of detecting the angle or the position of the object can be used. More particularly, touch screen input devices include resistive, surface capacitive, surface acoustic wave (SAW), infrared (IR), Frustrated Total Internal Reflection (FTIR), Projected capacitive, optical and bending wave. Often, the foregoing touch screen devices (aside from some optical and infrared technologies) require use of a touch enabled transparent cover layer that adds height to the display assembly.

Certain optical and infrared systems rely on detection of light traveling in optical paths that lie in one or more detection planes above the touched surface. For example, optical imaging for touch screens can use a combination of line-scan or area image cameras, digital signal processing, front or back illumination, and algorithms to determine a point or area of touch. Components used to emit and detect light in the detection plane(s) can be positioned along one or more edges of the touch screen area as part of a bezel surrounding the touch screen area.

Optical touch technology often uses line-scanning or area cameras orientated along one or more edges of the touch surface to image the bezel and track the movement of any object close to the surface of the touch screen by detecting the interruption of an infrared light source. For example, the light can be emitted across the surface of the touch screen by IR-LED emitters aligned along the optical axis of the camera to detect the intensity of light reflected by a retro-reflective border. Light can be projected from each of two optical units in a fan shape above the touch surface, with a linear photoreceptive sensor in each optical unit measuring the intensity of light detected by the optical units. If a finger, pen, or other object interrupts a portion of the light, the system can detect the direction of the shadow. Since the optical units are at known positions, the coordinates of the finger or pen can be calculated based on the triangulation principle.

SUMMARY

Objects and advantages of the present subject matter will be apparent to one of ordinary skill in the art upon careful review of the present disclosure and/or practice of one or more embodiments of the claimed subject matter.

In accordance with one or more aspects of the present subject matter, the performance of an optical touch display system can be improved through refinements to the light emitted across a touch surface bounded by a touch area. In a system that detects objects based on the intensity of light from a primary light source retroreflected to a detection system, accuracy can be improved for detection of an object close to the detection system by adjusting detected light to remove a component representative of light that reached the detector directly from the object. This can be achieved in some embodiments through the use of an error signal generated based on detected light that ultimately originated from a secondary light source positioned off-axis relative to the detection system.

For example, in some embodiments, a touch detection system comprises a light detection system having an optical center, a retroreflector positioned along at least one edge of a touch area, a primary illumination system, and a secondary illumination system. The primary illumination system can be positioned remote from the retroreflector, such as at a different edge of the touch area. The primary illumination system can be configured to emit light across the touch area so that, in the absence of an object in the touch area, at least some light originating from the primary illumination system is retroreflected to the detection system. For instance, the light may be emitted in a fan-shaped pattern having an apex, with the apex of the fan from the primary illumination system aligned with the optical center of the detection system. Perfect alignment would be desirable, but generally the alignment should be as close to the optical center of the detection system as is feasible.

In the absence of an object in the touch area (i.e. an object on or near the touch surface), light travels across the touch surface and is returned by the retroreflector to the light detection system. If an object is present, a shadow cast by the object can be detected as a variance in the pattern of detected light.

The secondary illumination system can also be positioned remote from the retroreflector and is also configured to emit light across the touch surface in a fan-shaped pattern having an apex. The secondary illumination system is configured so that, in comparison to the primary illumination system, less light (or even no light) from the secondary illumination system reaches the detection system in the absence of an object. For example, in some embodiments, the apex of the fan from the secondary illumination system is not aligned with the optical center of a detection system.

The touch detection system can comprise one or more computing devices interfaced with the primary illumination system, secondary illumination system, and light detection system. At least one computing device can be configured to determine the position at which an object has interfered with light traveling across the touch surface based on evaluating the patterns of light detected by the light detection system.

The pattern of light detected by the light detection system can be due to light that ultimately originated from either or both the primary and secondary illumination systems. The phrase "ultimately originated" is meant to refer to the ultimate source of the light prior to retroreflection of the light by the edges of the touch area, reflection of the light by an object in the touch area, or other interference that results in the light reaching the detection system.

In certain embodiments, a computing device or other components are configured to separate a pattern of detected light that ultimately originated from a primary illumination system from a pattern of detected light that ultimately originated from the secondary illumination system. For example, the patterns can be separated by phasing the secondary illumination system and primary illumination system and correlating the detected patterns to the particular time at which an illumination system is active.

By separating the detected patterns, the computing device(s) can adjust the pattern of light used in triangulating or otherwise determining the position at which an object has interfered with light traveling across the touch surface. If an object is interfering with light relatively close to the point at which the primary pattern of light is emitted, the magnitude of the detected signal due to light reflected or otherwise scattered to the detector by the object could skew the results. Namely, light from the object can lead to a reduction or elimination of the shadow effect of the object relative to the retroreflected light returned to the detection system.

However, the pattern of detected light that ultimately originated from the secondary illumination system can be used to account for some or all of the light from the primary illumination system that is reflected by the object. For example, the computing device(s) may be configured to subtract the detected pattern of light that ultimately originated from the secondary illumination system from the detected pattern of light that ultimately originated from the primary illumination system. The pattern of light that is subtracted features little to no retroreflected component due to the positioning of the secondary illumination system. Therefore, it is possible to "correct" the measured pattern of light that ultimately originated from the primary illumination system to remove components representing light reflected from the object without removing components properly returned due to retroreflection. The correction can result in complete or partial removal of the components due to direct reflection or other scattering by the object.

Phasing of the light sources and/or other separation operations may be carried out by the same computing device(s) that ultimately perform the triangulation operations or may be carried out by separate computing device or devices. For instance, a microcontroller, DSP, or other suitable components or circuitry may control phasing of the sources and adjusting the detected pattern, with triangulation performed by a computer interfaced to the microcontroller, DSP or other components.

In some embodiments, the light detection system and primary illumination system are incorporated into a single optical unit. The touch detection system can comprise two or more of the combined optical units, with each optical unit positioned remote from the retroreflector and each other. Each optical unit may include a secondary illumination system in some embodiments, while in other embodiments, one or more secondary illumination systems are included in the touch detection system but are separate from the optical units used for primary illumination and detection.

Either or both the primary and secondary illumination systems can comprise any suitable type or arrangement of light sources. In some embodiments, an illumination system includes a plurality of light sources configured to emit light as if they were a point source. An illumination system can include diffuser optics, such as a light-shaping diffuser, to better obtain a fan-like distribution of light from a discrete number of sources. In some embodiments, use of the diffuser allows fewer sources to be used in the illumination system.

Certain embodiments of a method of detecting the position of an object in a touch area are discussed herein. For instance, some such methods can comprise emitting light in a primary pattern across a touch surface towards one or more edges of a touch area bounding the surface. The primary pattern can be centered on an optical axis of a detection system positioned to detect a retroreflected pattern of light. Multiple primary patterns can be emitted, each from a corresponding location and each centered on an optical axis of a corresponding detection system.

The method can also comprise emitting light in a secondary pattern across the touch surface, with the secondary pattern off-center relative to the optical axis of the detection system or systems, or otherwise emitted so that, in the absence of an object, less light ultimately originating from the secondary pattern is received by the detection system relative to the amount of light from the primary pattern. The method can comprise detecting light detected by the detection system(s) and generating a detected light signal. If multiple detection systems are used, each detection system generates a respective detected light signal.

The method can further comprise adjusting a detected light signal to yield a corrected light signal, with the corrected light signal representing detected light adjusted to partially or completely remove one or more components due to reflection or other scattering of light from an object in the touch area. The method can comprise determining the location of an object interfering with transmission of light in the touch area.

For example, multiple primary patterns may be emitted, and the location of an object can be determined by determining the direction of a shadow cast by an object interfering with light in the touch area relative to two or more detection systems. The method can comprise triangulating the location of the object in the touch area based on the direction of the shadow and spatial arrangement of the detection systems.

In some embodiments, adjusting the detected light signal comprises subtracting a detected light signal representing detected light that originated from the secondary pattern from a detected light signal representing detected light that originated from the primary pattern. This may be facilitated in some embodiments by phasing the primary and secondary patterns so that, for at least part of a time during which the primary pattern is emitted, a secondary pattern is not emitted. The detected light that originated from the respective primary and secondary illumination patterns can be separated by correlating the detected light signal to the time during which the illumination patterns were emitted.

In some embodiments, the system includes one or more display devices, the display device(s) having a surface positioned parallel to or corresponding to the touch surface. For example, an LCD display or a protective covering on the display may correspond to the touch surface. The display device can, in some embodiments, be interfaced with at least one computing device. Accordingly, the computing device(s), in conjunction with the touch detection system and displays, can provide a touch-enabled display for use in operating and/or otherwise interacting with the computing device(s).

In some embodiments, a computer system is configured to be interfaced with a touch detection system, the computer system comprising at least one computing device configured to direct a primary illumination source and a secondary illumination source to emit light across a touch surface having a touch area. The computing device(s) can further be configured to receive, from each of at least two detectors, data representing a pattern of light impinging on the detector from the touch area. The computing device(s) can be configured to perform a correction operation on the data representing the patterns of light from the touch area and, based on the data from the correction operation, determine the location of an object relative to the touch area if an object is present.

In some embodiments, the correction operation can comprise removing a component of light representative of light directly reflected from an object in the touch area. Of course, in some instances, such as when an object is not present or the object is remote from the detectors receiving the light, it will be understood that the correction operation will yield data representing a pattern of light that is the same as, or nearly the same as, the initially received pattern.

In certain implementations, the computing device(s) are configured to separate (a) a pattern of light received from the touch area that ultimately originated from the primary source and (b) a pattern of light received from the touch area and that ultimately originated from the secondary source. In performing the correction operation, pattern (b) can be subtracted from pattern (a). Patterns (b) and (a) may be identified in some embodiments based on the time at which a pattern is detected relative to the operation of the illumination sources. For instance, the primary and secondary illumination sources can be directed to emit light in a phased manner so that, for at least part of the time a primary source is active, a secondary source is not active, and vice-versa.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the following appended figures, in which use of like reference numerals in different features is intended to illustrate like or analogous components:

DETAILED DESCRIPTION

Reference will now be made in detail to various and alternative exemplary embodiments and to the accompanying drawings, with like numerals representing substantially identical structural elements. Each example is provided by way of explanation, and not as a limitation. It will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the instant disclosure includes modifications and variations as come within the scope of the appended claims and their equivalents.

Figure 1:
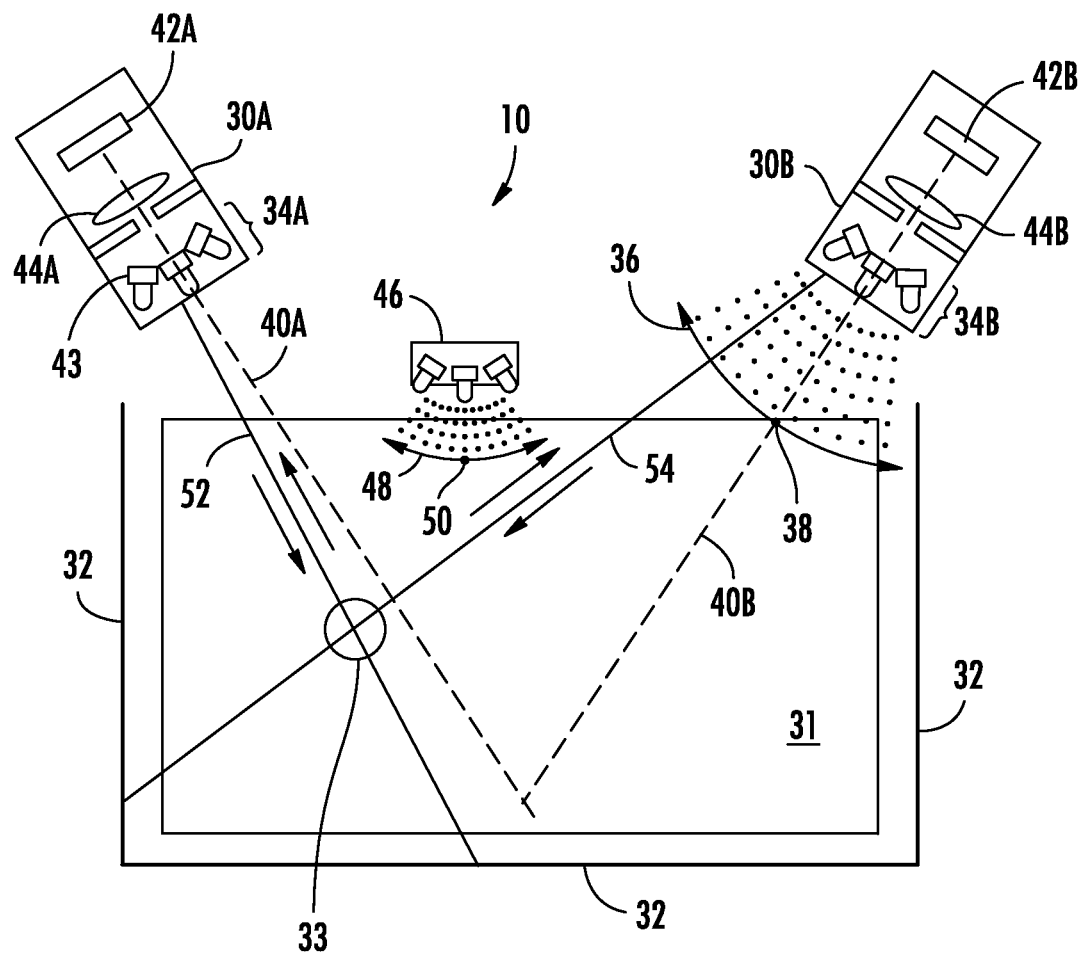
FIG. 1 is a diagram illustrating an exemplary touch detection system comprising primary and secondary illumination sources in a touch detection system according to some embodiments.

FIG. 1 is a diagram illustrating an exemplary touch detection system 10. In this example, a touch area 31 is bounded by edges 32. For instance, touch area 31 may correspond to a touch surface, such as the top of a display or protective layer on a display to be used in a touch-enabled display system. Edges 32 may correspond to a bezel that surrounds the display area.

FIG. 1 further illustrates two optical units 30A and 30B; in practice, optical units 30A and 30B may be smaller than illustrated in FIG. 1 and may be mounted in or under a bezel at the edges of touch area 31. In this example, optical units 30A and 30B are positioned remote from one another and edges 32, for instance, at or near the upper corners of touch area 31. Of course, optical units 30A and 30B could be positioned elsewhere, and more optical units could be used in other embodiments.

Each optical unit 30 includes a primary illumination system 34 (comprising a set of diodes 43 in a fan-shaped arrangement in this example) and detection system 42, with light relayed to detection system 42 via lens 44. Primary illumination system 34 emits light in a fan-shaped pattern 36 (a "primary illumination pattern") having an apex 38. It will be understood that each illumination system 34 is configured to emit light in a fan-shaped pattern, and pattern 36 is shown solely in conjunction with unit 30B in FIG. 1 only for purposes of clarity. The apex 38 of the pattern from each primary illumination system is aligned with the optical center 40 of the respective detection system 42.

FIG. 1 further illustrates a secondary illumination system 46 which is also configured to emit light in a fan-shaped pattern 48 (a "secondary illumination pattern") having an apex 50. In contrast to the apex of light from a primary illumination system 34, light from a secondary illumination system 46 is not aligned with the optical center 40 of a detection system 42.

Either illumination system can comprise any suitable type or number of illumination components. For example, LEDs or diodes may be used, and in some embodiments, the illumination sources comprise infrared (IR) sources. Detection system 42 can comprise any suitable type or arrangement of components suitable for detecting light detected by the optical unit and thereby imaging the edges of the touch area. For example, detection system 42 may comprise a photodetector or photodiode. As another example, a line detector or area detector based on CMOS or other technology may be used.

Light from a primary illumination source can be emitted across touch area 31 and retroreflected so that the light returns to the point of origin. For example, primary illumination system 34 can be configured to emit light as if the light were from a point source. The returning light is then directed via an aperture to detection system 42. For example, two optical paths 52 and 54 are shown in FIG. 1. In the absence of an object on or near the touch surface, light travels from source 34, across touch area 31, and is then reflected by retroreflective components positioned along edges 32. The pattern of the light is then detected by detection system 42 and converted into a signal.

If an object interferes with the transmission of light across touch area 31, the object's location can be determined from changes in the characteristics of the light detected by detection systems 42. For example, if an object is positioned on or near the touch surface at location 33, then both exemplary optical paths 52 and 54 will be interrupted. Specifically, light from primary illumination systems 34 will reach the object at location 33, but will not be retroreflected. Put another way, the object at location 33 will cast a shadow in the retroreflected light. The optics associated with detection systems 42 are configured so that the location of the shadow relative to the detector geometry corresponds to a particular direction for the shadow. Based on the direction of the shadow as detected by detection systems 42A and 42B and the known spatial relationship between detection systems 42A and 42B, location 33 can be identified through triangulation.

Figure 3:
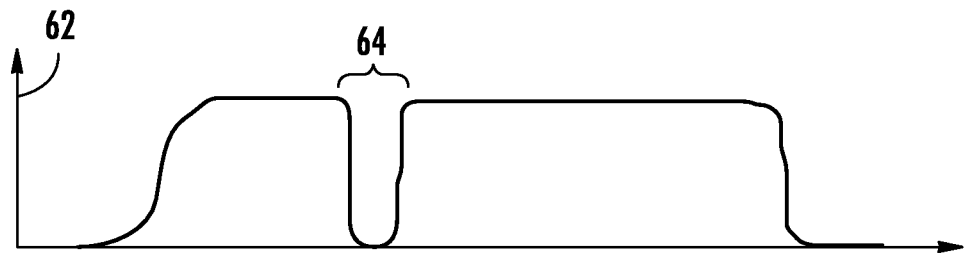
FIGS. 3 and 4 are diagrams showing hypothetical signals representative of light received by a detection system in certain embodiments.
Figure 3:
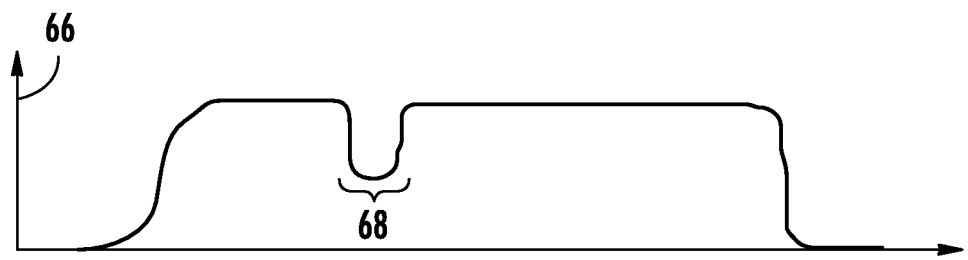
Figure 3:
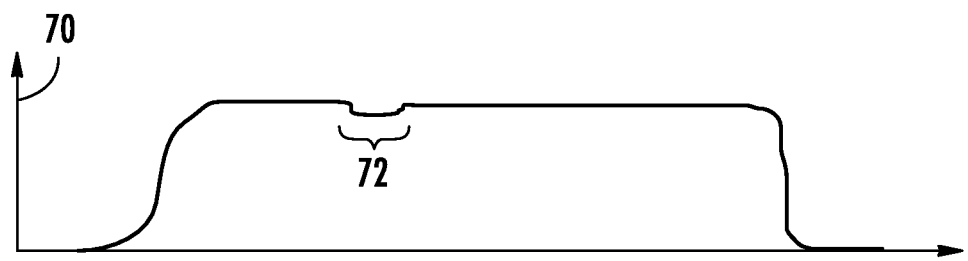

Turning ahead to FIG. 3, the effect of the object on received light can be observed in signal diagram 62. In this example, signal diagram 62 represents a pattern of light received at a detection system 42 that ultimately originated from a primary illumination source. For example, diagram 62 can represent the intensity of detected light (vertical axis of 62) along the length of the detector (horizontal axis of 62). Variance 64 indicates where the intensity of the light is decreased due to the shadow of an object.

Figure 2:
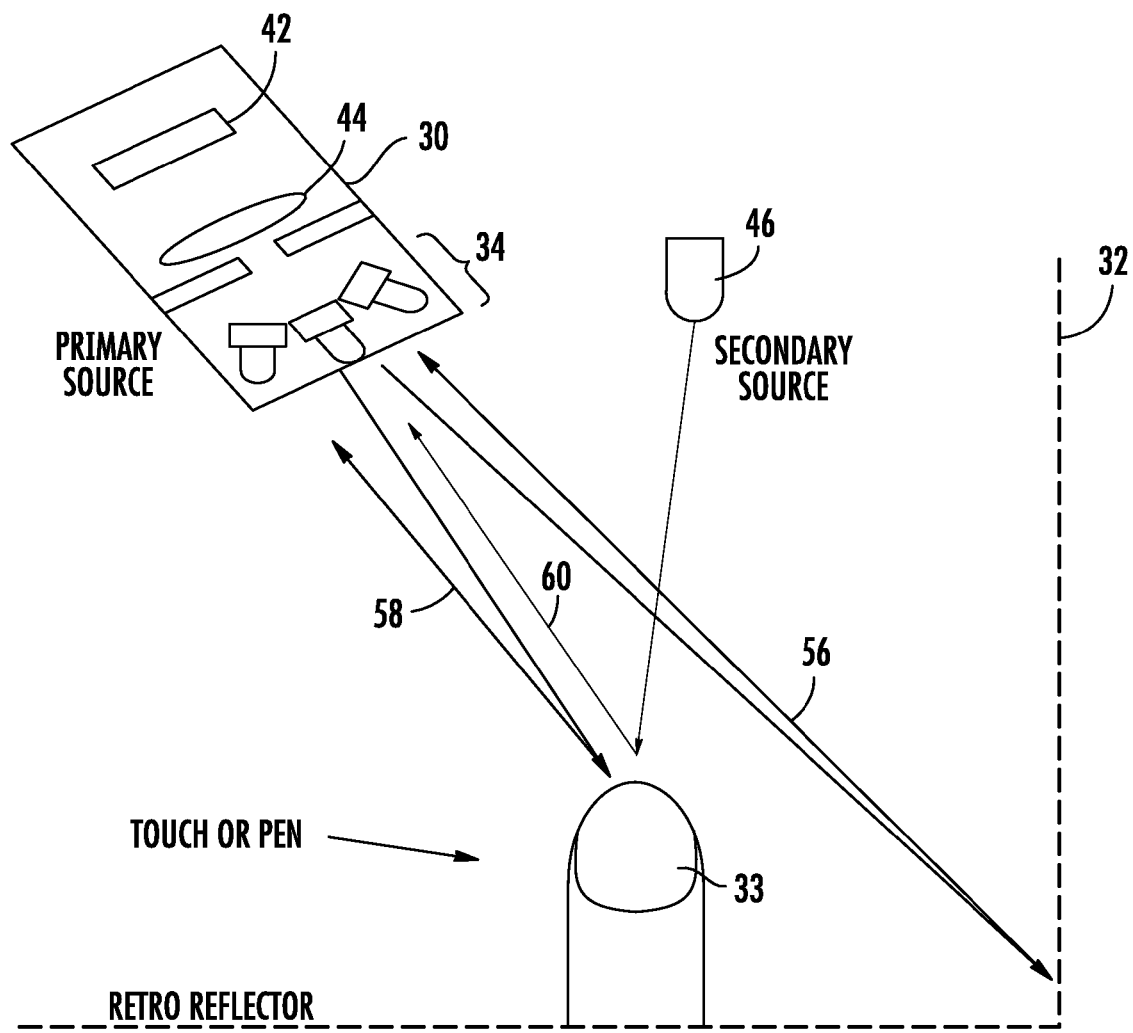
FIG. 2 is an exploded view illustrating the behavior of light from the primary and secondary illumination sources of FIG. 1 in closer detail.

Certain problems may arise, however, depending on the position of an object relative to a detection system. FIG. 2 is an exploded view illustrating the behavior of light in some exemplary touch detection systems. In this example, an optical unit 30 comprising a primary illumination system 34 and a detection system 42 is shown, along with a generalized view of a secondary illumination system 46 and a retroreflector positioned along edges 32. Ray trace 56 indicates an optical path followed by light emitted from primary illumination source 34 as it travels across the touch area and is returned to detection system 42. As was noted above, if this path is interrupted by an object, then the shadow of the object can be used to determine the object's location within the touch area.

FIG. 2 illustrates an object 33 interrupting another optical path, with the results of the interruption illustrated as ray trace 58. Object 33 prevents retroreflection of light originating from primary illumination system and traveling along ray trace 58. However, in this example, object 33 is relatively close to optical unit 30, which can introduce additional complications. Because object 33's location is closer to primary illumination system 34, object 33 may itself reflect light from primary illumination system 34 as shown by the return path of ray trace 58. Thus, although retroreflected light is blocked by object 33, its shadow effect on detection system 42 may be reduced or eliminated. The shadow may be "filled in" by light directly reflected from the closely-positioned object. Although in this example, light is reflected from the closely-positioned object, the light may be refracted or otherwise scattered by the object so that the light is received by detection system 42. Loss of the ability to accurately identify and/or track the shadow can lead to a loss in accuracy for the touch detection system.

Turning again to FIG. 3, this effect can be seen in signal diagrams 66 and 70. Diagram 66 represents primary illumination received at the detection system when an object is closer to the illumination source/detection system than that illustrated in signal diagram 62. In diagram 66, the reduction in intensity due to object 33 is shown at 68. Although still visible in FIG. 3, intensity variance 68 is not as pronounced as variance 64 of diagram 62. Diagram 70 represents an even more extreme case, with the object moved even closer than in diagram 66. In this example, the variance illustrated at 72 is barely perceptible relative to the remainder of the signal.

Turning back to FIG. 2, the role of secondary illumination system 46 can be described in further detail. As was noted above, secondary illumination system 46 can be configured to emit light in a fan-shaped pattern with an apex not aligned with the optical center of a detection system 42. This configuration can advantageously allow for secondary illumination system 46 to be used to generate an error signal. Since secondary illumination system 46 is not aligned with a detection system 42, light retroreflected from edges 32 does not return to detection system 42 as light from primary illumination system 34 does. Rather, in the absence of an object in the touch area, less light from the secondary illumination system reaches the detection system than from the primary illumination system. In some embodiments, in the absence of an object in the touch area, little or no light from secondary illumination system 46 will reach detection system 42. Instead, the light will be retroreflected towards its origin, secondary illumination system 46.

Figure 4:
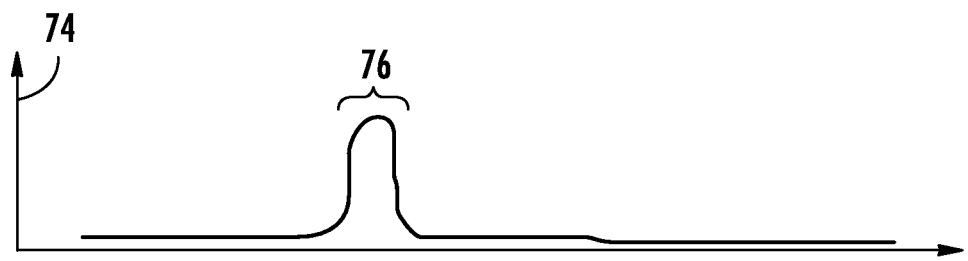
Figure 4:
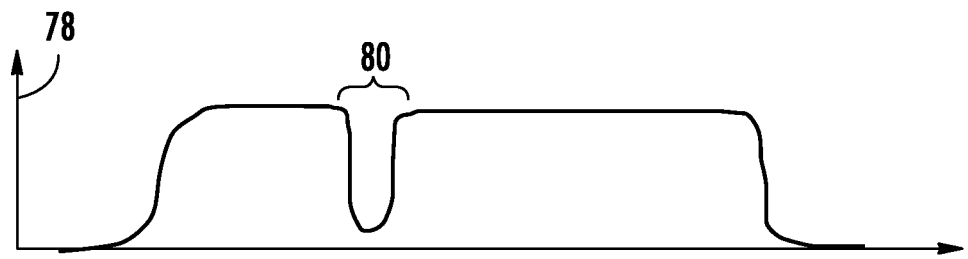

However, if an object is in the touch area, light from secondary illumination system 46 nonetheless may be detected. Ray trace 60 in FIG. 2 represents an example of an optical path followed by light emitted from secondary illumination system 46. In this example, light is emitted from illumination system 46 and is detected by detection system 42 after being reflected from object 33. This effect is also shown in signal diagram 74 of FIG. 4. In this example, variance 76 represents an increase in signal intensity due to the reflected light from object 33 ultimately originating from secondary source 46.

The signal representing detected light that ultimately originated from the secondary illumination system can be used to correct the signal representing light that ultimately originated from the primary illumination system. For example, signal diagram 78 represents the outcome of a correction operation in which the detected pattern of light that ultimately originated from the secondary illumination system is subtracted from the detected pattern of light that ultimately originated from the primary illumination system.

In this example, signal diagram 74 has been subtracted from signal diagram 70 to yield signal diagram 78. Variance 80 of signal diagram 78 more accurately represents the shadow cast by object 33 in the retroreflected light from primary illumination system 34. Due to the correction, the shadow is no longer overwhelmed. However, since the detected pattern based on light ultimately originating from the secondary illumination system has a negligible retroreflected component, the subtraction operation has minimal or no impact on the remainder of the pattern of detected light that ultimately originated from the primary illumination system.

Detected patterns of light representing light ultimately originating from the primary and secondary sources can be isolated in any suitable manner. In some embodiments, the primary illumination system 34 and secondary illumination system 46 can be phased so that, for at least part of the time that light is emitted from primary illumination system 34, light is not emitted from secondary illumination system 46, and vice versa. The patterns representing detected light ultimately originating from the respective sources can be identified by reference to the time at which a measurement was made. The phasing can occur at any suitable rate, and may be a part of another phasing scheme (i.e. if multiple primary illumination systems are phased relative to one another, all primary illumination may be phased relative to one or more secondary illumination systems, and so on).

In some embodiments, phasing of the illumination sources and correction of the detected patterns is carried out through the use of a computer system comprising one or more computing devices. The use of the term "computing device" is meant to not only include processor-based devices, but also other arrangements of hardware (including analog components) that can provide an output signal from one or more inputs.

The computing device(s) can direct the primary and secondary illumination sources to emit light and can receive data representing a pattern of light detected by the light detectors of the system. It should be understood that the data may be in any suitable form, including, but not limited to, digital representations of the light patterns and analog signals. The computing devices can separate the signals resulting from light from the primary and secondary illumination sources and perform a correction operation on the data representing the patterns of light detected by each detector. For instance, the correction operation can comprise the subtraction operation noted above.

In some circumstances, the "correction" may have little or no effect on the actual signal used to triangulate an object's position. For instance, when an object is relatively far from an illumination/detection system, the effect of light reflected from the object on the pattern of detected light from the primary illumination system will usually be minimal or nonexistent. If the secondary illumination system is properly positioned, the amount of detected light that ultimately originated from the secondary illumination system should also be minimal or nonexistent, resulting in a "correction" of little to no magnitude where none is needed.

Figure 5:
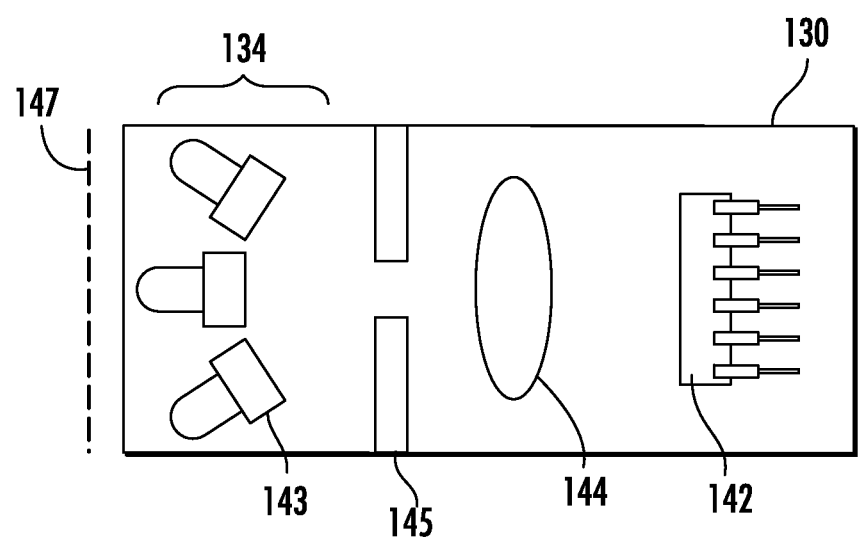
FIG. 5 is a diagram illustrating an exemplary optical unit comprising an illumination system and a detection system.

FIG. 5 is a diagram illustrating an exemplary optical unit 130 comprising an illumination system 134 and a detection system 142. Optical unit 130 may be suitable for use in some embodiments of the present subject matter. Light is returned via an aperture in wall 145 via lens 144. Optical unit 130 includes a set of diffuser optics 147 which may advantageously reduce the number of sources required to obtain the fan-shaped pattern. Diffuser optics 147 may comprise, for example, a light shaping diffuser, such as a diffuser available from Luminit LLC, 20600 Gramercy Place Building 203 Torrance, Calif., USA. Similar diffuser optics could be used in a secondary illumination system, as well.

Figure 6:
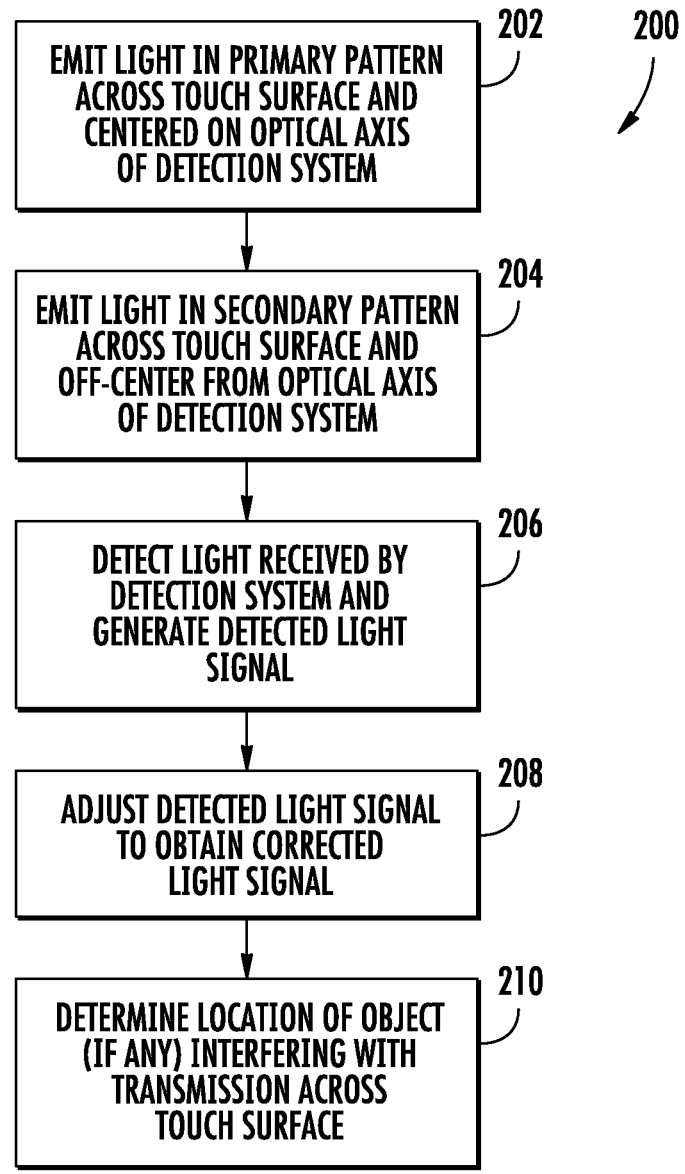
FIG. 6 is a flowchart showing exemplary steps in a method of touch detection.

FIG. 6 is a flowchart showing exemplary steps in a method 200 for determining location of an object relative to a touch area. At step 202, a primary pattern of light is emitted across a touch surface and centered on an optical axis of a detection system. In some embodiments, step 202 represents emitting a primary pattern of light from each of a plurality of primary illumination systems, each primary illumination system emitting a pattern centered on an optical axis of a respective detection system.

At step 204, a secondary pattern of light is emitted across the touch surface, with the secondary pattern emitted so as to be off-center relative to the detection axis of a detection system. If multiple primary illumination systems and associated detection systems are used, the secondary pattern may be off-center relative to the optical axis of all the detection systems for which the secondary pattern will be used to generate a pattern of detected light for use in error correction. Multiple secondary patterns may be emitted or a single secondary pattern may be used for purposes of multiple detection systems.

As was noted above, in some embodiments, light in the primary pattern(s) and secondary pattern or patterns can be phased to facilitate separation of patterns of detected light. Thus, steps 202 and 204 may be carried out so that light in the primary and secondary patterns are emitted at different times from one another.

At step 206, light received by the detection system(s) is detected and one or more detected light signals is generated. As was noted above, multiple detection systems may be used for triangulation purposes; in such cases, a detected light signal is generated from each respective detection system.

Each detected light signal represents the pattern of light detected by the detection system, and may be in any suitable form. For instance, an analog or digital intensity signal may be provided. If a linear detector is used, the signal can represent the intensity of light detected along the length of the detector. Although several examples herein relate to a line detector, it will be understood that area detectors/cameras could be used as well.

Step 208 represents adjusting each detected light signal to obtain a corrected light signal. Use of the term "corrected" and "adjust" is not meant to imply that the detected light signal must always be changed. Instead, as was mentioned previously, a "corrected" light signal may not vary significantly or at all from the detected light signal in some circumstances, such as when an object is positioned in the touch area but far from the detector optics.

Ultimately, the degree of change will depend on factors including the positioning of the object (if any) in the touch area and its resulting effect on transmission of light across the touch area. Moreover, in some embodiments, each detection system has its own detected light signal that is adjusted based on an error signal generated by the same detection system. For instance, in a system comprising multiple detection systems, if an object is much closer to a first detector than a second detector, the correction to a pattern of light detected at the first detector may be much larger than the correction to a pattern of light detected at the second detector.

At step 210, the location of an object (if any) interfering with transmission across the touch area is determined using the corrected light signals from one or more detection systems. For example, the triangulation principle may be used to determine the location of an object based on the direction of at least two shadows cast by the object due to the object blocking or preventing retroreflection of light emitted from the primary illumination systems. Since the triangulation is based on the corrected signals, accuracy is improved as compared to signals that include a component of light reflected from the object itself.

Figure 7:
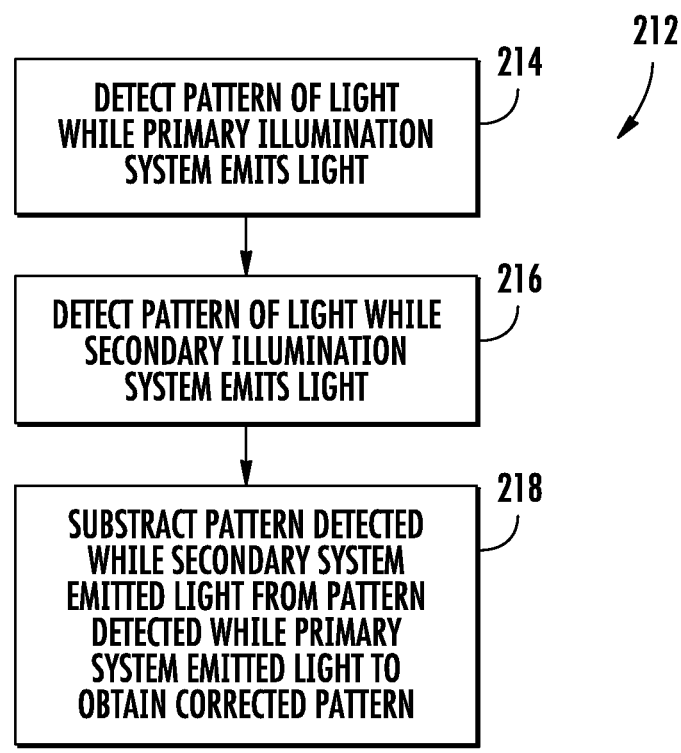
FIG. 7 is a flowchart showing exemplary steps in a method for correcting a signal representing light received by a detector.

FIG. 7 is a flowchart showing exemplary steps in a method 212 for adjusting a detected light signal to obtain a corrected light signal. At 214, a first pattern is detected, the first pattern comprising light received by a detection system while the primary illumination system emits light. At 216, a second pattern is detected, the second pattern comprising light received by the detection system while the secondary illumination system emits light. At 218, the second pattern is subtracted from the first pattern. For example, if the patterns are represented as intensity signals, the intensity signals for corresponding areas of the detector are subtracted. If the patterns are represented as rows or grids of pixels, then the pixel values for the second pattern can be subtracted from the pixel values for the first pattern.

Figure 8:
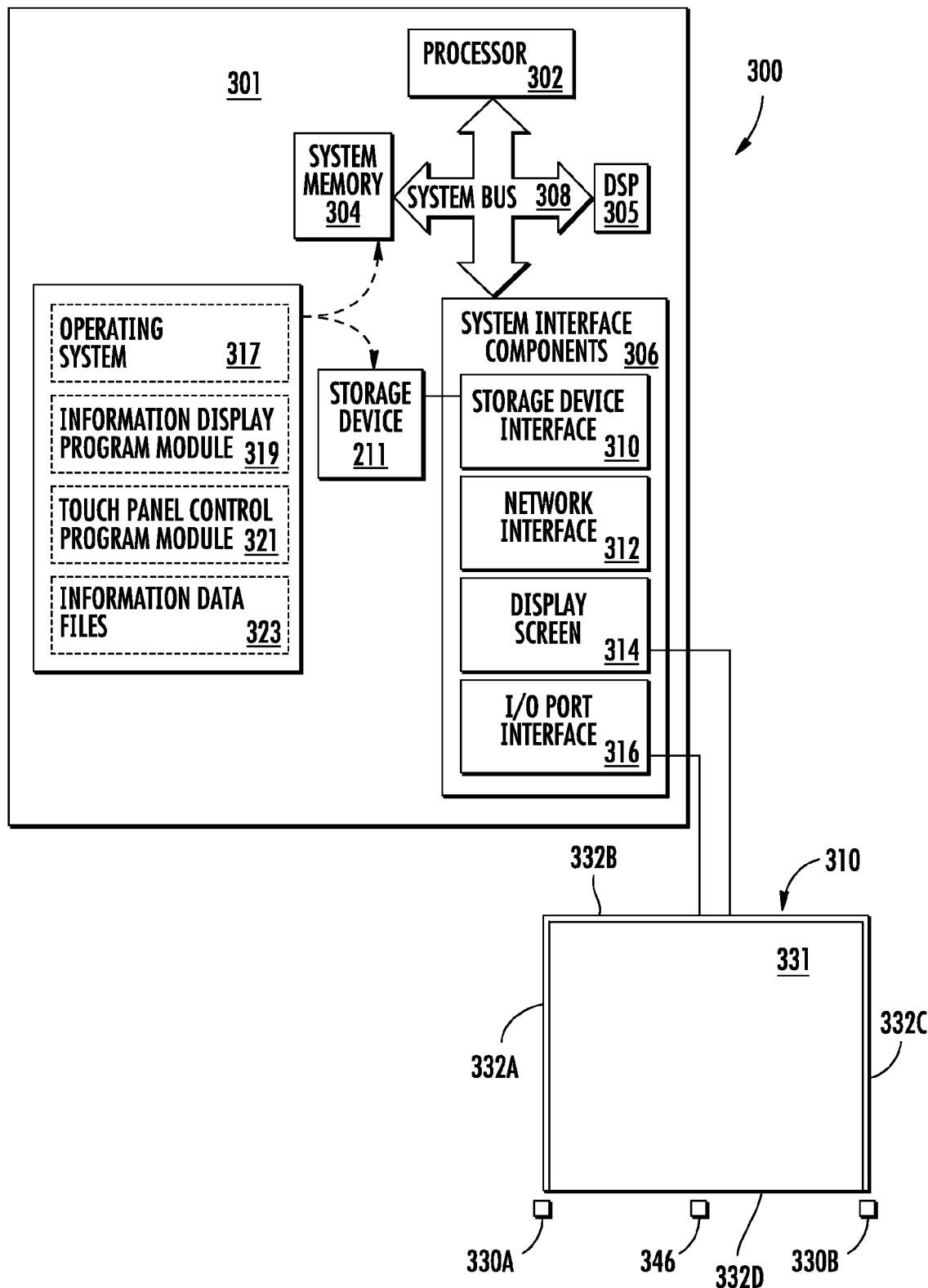
FIG. 8 is a block diagram illustrating an exemplary touch panel display system interfaced with an exemplary computing device.

FIG. 8 is a block diagram illustrating an exemplary touch detection system 310 as interfaced to an exemplary display and computing device 301 to yield a touch screen system 300. Computing device 301 may be functionally coupled to touch screen system 310, by hardwire and/or wireless connections. Computing device 301 may be any suitable computing device, including, but not limited to a processor-driven device such as a personal computer, a laptop computer, a handheld computer, a personal digital assistant (PDA), a digital and/or cellular telephone, a pager, a video game device, etc. These and other types of processor-driven devices will be apparent to those of skill in the art. As used in this discussion, the term "processor" can refer to any type of programmable logic device, including a microprocessor or any other type of similar device.

Computing device 301 may include, for example, a processor 302, a system memory 304, and various system interface components 306. The processor 302, system memory 304, a digital signal processing (DSP) unit 305 and system interface components 306 may be functionally connected via a system bus 308. The system interface components 306 may enable the processor 302 to communicate with peripheral devices. For example, a storage device interface 310 can provide an interface between the processor 302 and a storage device 311 (e.g., removable and/or non-removable), such as a disk drive. A network interface 312 may also be provided as an interface between the processor 302 and a network communications device (not shown), so that the computing device 301 can be connected to a network.

A display screen interface 314 can provide an interface between the processor 302 and display device of the touch screen system. For instance, interface 314 may provide data in a suitable format for rendering by the display device over a DVI, VGA, or other suitable connection.

In this example, touch screen 100 is bounded by edges 332A, 332B, 332C, and 332D. For instance, a bezel may be positioned along each edge to protect the edges of the screen. In this example, the edges of touch area 331 correspond to edges 332. As was noted above, a touch surface may correspond to the outer surface of the display or may correspond to the outer surface of a protective material positioned on the display.

FIG. 8 further illustrates a plurality of optical units 330, in this example units 330A and 330B, positioned in the corners of the display along edge 332D. Optical units 330A and 330B comprise a primary illumination system configured to emit a fan-shaped pattern of light centered on an optical axis of a detection system for each respective optical unit. FIG. 8 also illustrates a secondary illumination system 346 positioned along edge 332D between optical units 330A and 330B.

One or more input/output ("I/O") port interfaces 316 may be provided as an interface between the processor 302 and various input and/or output devices. For example, the detection systems and primary illumination systems of each optical unit 330 may be connected to the computing device 301 and may provide input signals representing patterns of light detected by the detectors to the processor 302 via an input port interface 316. Similarly, the primary illumination systems of the optical units 330 and the secondary illumination system 346 may be connected to the computing device 301 and may receive output signals from the processor 302 via an output port interface 316.

A number of program modules may be stored in the system memory 304, any other computer-readable media associated with the storage device 311 (e.g., a hard disk drive), and/or any other data source accessible by computing device 301. The program modules may include an operating system 317. The program modules may also include an information display program module 319 comprising computer-executable instructions for displaying images or other information on a display screen. Other aspects of the exemplary embodiments of the invention may be embodied in a touch screen control program module 321 for controlling the primary and secondary illumination systems, detector assemblies, and/or for calculating touch locations and discerning interaction states relative to the touch screen based on signals received from the detectors.

In some embodiments, a DSP unit is included for performing some or all of the functionality ascribed to the Touch Panel Control program module 321. As is known in the art, a DSP unit 305 may be configured to perform many types of calculations including filtering, data sampling, and triangulation and other calculations and to control the modulation and/or other characteristics of the illumination systems. The DSP unit 305 may include a series of scanning imagers, digital filters, and comparators implemented in software. The DSP unit 305 may therefore be programmed for calculating touch locations and discerning other interaction characteristics as known in the art.

The processor 302, which may be controlled by the operating system 317, can be configured to execute the computer-executable instructions of the various program modules. Methods in accordance with one or more aspects of the present subject matter may be carried out due to execution of such instructions. Furthermore, the images or other information displayed by the information display program module 319 may be stored in one or more information data files 323, which may be stored on any computer readable medium associated with or accessible by the computing device 301.

When a user touches on or near the touch screen, a variation will occur in the intensity of the energy beams that are directed across the surface of the touch screen in one or more detection planes. The detectors are configured to detect the intensity of the energy beams reflected or otherwise scattered across the surface of the touch screen and should be sensitive enough to detect variations in such intensity. Information signals produced by the detector assemblies and/or other components of the touch screen display system may be used by the computing device 301 to determine the location of the touch relative to the touch area 331. Computing device 301 may also determine the appropriate response to a touch on or near the screen.

In accordance with some implementations, data from the detection system may be periodically processed by the computing device 301 to monitor the typical intensity level of the energy beams directed along the detection plane(s) when no touch is present. This allows the system to account for, and thereby reduce the effects of, changes in ambient light levels and other ambient conditions. The computing device 301 may optionally increase or decrease the intensity of the energy beams emitted by the primary and/or secondary illumination systems as needed. Subsequently, if a variation in the intensity of the energy beams is detected by the detection systems, computing device 301 can process this information to determine that a touch has occurred on or near the touch screen.

The location of a touch relative to the touch screen may be determined, for example, by processing information received from each detection system and performing one or more well-known triangulation calculations. The location of the area of decreased energy beam intensity relative to each detection system be determined in relation to the coordinates of one or more pixels, or virtual pixels, of the display screen. The location of the area of increased or decreased energy beam intensity relative to each detector may then be triangulated, based on the geometry between the detection systems to determine the actual location of the touch relative to the touch screen. Any such calculations to determine touch location can include algorithms to compensation for discrepancies (e.g., lens distortions, ambient conditions, damage to or impediments on the touch screen or other touched surface, etc.), as applicable.

The above examples referred to various illumination sources and it should be understood that any suitable radiation source can be used. For instance, light emitting diodes (LEDs) may be used to generate infrared (IR) radiation that is directed over one or more optical paths in the detection plane. However, other portions of the EM spectrum or even other types of energy may be used as applicable with appropriate sources and detection systems.

Several of the above examples were presented in the context of a touch-enabled display. However, it will be understood that the principles disclosed herein could be applied even in the absence of a display screen when the position of an object relative to an area is to be tracked.

The various systems discussed herein are not limited to any particular hardware architecture or configuration. As was noted above, a computing device can include any suitable arrangement of components that provide a result conditioned on one or more inputs. Suitable computing devices include multipurpose microprocessor-based computer systems accessing stored software, but also application-specific integrated circuits and other programmable logic, and combinations thereof. Any suitable programming, scripting, or other type of language or combinations of languages may be used to implement the teachings contained herein in software.

Embodiments of the methods disclosed herein may be executed by one or more suitable computing devices. Such system(s) may comprise one or more computing devices adapted to perform one or more embodiments of the methods disclosed herein. As noted above, such devices may access one or more computer-readable media that embody computer-readable instructions which, when executed by at least one computer, cause the at least one computer to implement one or more embodiments of the methods of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Any suitable computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices, and the like.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A touch detection system, comprising:
    a light detection system having an optical center and configured to detect patterns of light received from a touch area;
    a retroreflector positioned along at least one edge of a touch surface in the touch area;
    a primary illumination system configured to emit light across the touch surface towards the retroreflector so that at least some of the light ultimately originating from the primary illumination system is retroreflected to the light detection system in the absence of an object in the touch area;
    a secondary illumination system configured to emit light across the touch surface so that, in the presence of the object in the touch area at least some of the light ultimately originating from the secondary illumination system is reflected by the object to the light detection system; and
    at least one computing device interfaced with the light detection system and configured to determine a position at which the object present in the touch area has interfered with light traveling across the touch surface by:
        generating an error signal based on a secondary detected pattern of the light ultimately originating from the secondary illumination system, wherein the error signal is indicative of the object being sufficiently close to the light detection system to cause a variance in a primary detected pattern of the light ultimately originating from the primary illumination system, and
        subtracting the intensity of the error signal from the intensity of the primary detected pattern.

2. The touch detection system set forth in claim 1, wherein:
    the primary illumination system is positioned remote from the retroreflector and emits light in a fan-shaped pattern having a first apex, the first apex aligned with the optical center of the light detection system; and
    the secondary illumination system is positioned remote from the retroreflector and configured to emit light across the touch surface in a fan-shaped pattern having a second apex, the second apex not aligned with the optical center of the light detection system.

3. The touch detection system set forth in claim 1, wherein the light detection system and the primary illumination system are incorporated into a single optical unit and the touch detection system comprises at least two of the optical units, each optical unit positioned remote from the retroreflector and each other.

4. The touch detection system set forth in claim 3, wherein, for each optical unit, the at least one computing device is configured to:
    identify the primary detected pattern; and
    identify the secondary detected pattern.

5. The touch detection system set forth in claim 4, wherein the at least one computing device is configured to identify a light pattern as being either the primary detected pattern or the secondary detected pattern based on the time the light pattern was detected relative to the time at which the primary and secondary illumination systems were emitting light.

6. The touch detection system set forth in claim 1, wherein the primary illumination system comprises a plurality of light sources configured to mimic the light emission of a point source.

7. The touch detection system set forth in claim 1, wherein the primary illumination system and the secondary illumination system are phased such that, for at least part of the time that the secondary illumination system is emitting light, the primary illumination system is not emitting light.

8. A method of detecting a position of an object in a touch area, the method comprising:
    emitting light in a primary pattern towards one or more edges defining the touch area of a touch surface, the primary pattern emitted so that, in the absence of the object in the touch area, at least some of the light will be retroreflected to a detection system;
    emitting light in a secondary pattern across the touch surface, the secondary pattern emitted so that, in the presence of the object in the touch area, at least some of the light from the secondary pattern will be reflected to the detection system;
    detecting light received by the detection system and generating a detected light signal;
    adjusting the detected light signal to yield a corrected light signal based on the intensity of detected light that ultimately originated from the secondary pattern by:
        generating an error signal based on a secondary light signal representing light ultimately originating from the secondary pattern, wherein the error signal is indicative of the object being sufficiently close to the light detection system to cause a variance in a primary light signal representing light ultimately originating from the primary pattern, and subtracting the error signal from the primary light signal; and determining, from the corrected light signal, that the object is interfering with the transmission of light in the touch area and a location of the object relative to the touch area.

9. The method set forth in claim 8, wherein, for at least part of a time the secondary pattern is emitted, the primary pattern is not emitted.

10. The method set forth in claim 8, wherein determining the location of the object relative to the touch area comprises:

identifying the direction of a shadow cast by the object at first and second detector locations; and triangulating the location of the object based on the direction of the shadow relative to each detector and the spatial arrangement of the first and second detector locations.

11. The method set forth in claim 8, wherein emitting light in the primary pattern comprises emitting light in a primary pattern from a plurality of primary sources, each source associated with a respective detection system so that, in the absence of the object in the touch area, at least some of the light from each source will be retroreflected to its associated detection system.

12. The method set forth in claim 8, wherein subtracting the error signal from the primary light signal comprises subtracting a secondary pixel value corresponding to the secondary pattern from a primary pixel value corresponding to the primary pattern.

13. The method set forth in claim 8, wherein subtracting the error signal from the primary light signal comprises subtracting a secondary intensity signal corresponding to the secondary pattern from a primary intensity signal corresponding to the primary pattern.

14. A computer system configured to be interfaced with a touch detection system, the computer system comprising at least one computing device configured to:

direct a primary illumination source and a secondary illumination source to emit light across a touch surface having a touch area;

receive, from each of at least two detectors, data representing a pattern of light received from the touch area by each detector;

perform a correction operation on the data representing each pattern of received light, wherein the correction operation comprises:

generating an error signal based on a component of light representative of light directly reflected from an object in the touch area, wherein the error signal is indicative of the object being sufficiently close to the light detection system to cause a variance in the pattern of light received from the touch area, and subtracting the intensity of the error signal from the intensity of a signal representing the pattern of light received from the touch area; and based on correction data resulting from the correction operation, determine a location of the object relative to the touch area.

15. The computer system set forth in claim 14, wherein the at least one computing device is configured to direct the primary illumination source and secondary illumination source to emit light in a phased manner.

16. The computer system set forth in claim 15, wherein the at least one computing device is configured to:

separate a first pattern of light returned from the touch area while the primary illumination source is emitting light and a second pattern of light returned from the touch area while the secondary illumination source is emitting light; and in performing a correction operation, subtract the second pattern from the first pattern.

17. The computer system set forth in claim 16, wherein the at least one computing device is configured to, in separating the first pattern and the second pattern, correlate the first pattern to an interval during which the primary illumination source is emitting light and correlate the second pattern to an interval during which the secondary illumination source is emitting light.

* * * * *